United States Patent
Tomlin et al.

(10) Patent No.: US 9,489,296 B1
(45) Date of Patent: Nov. 8, 2016

(54) METHODS, DEVICES AND SYSTEMS FOR HARDWARE-BASED GARBAGE COLLECTION IN SOLID STATE DRIVES

(71) Applicants: Western Digital Technologies, Inc., Irvine, CA (US); Skyera, LLC, San Jose, CA (US)

(72) Inventors: Andrew J. Tomlin, San Jose, CA (US); Rodney N. Mullendore, San Jose, CA (US); Justin Jones, Burlingame, CA (US)

(73) Assignees: Western Digital Technologies, Inc., Irvine, CA (US); Skyera, LLC, San Jose, CA (US)

( * ) Notice: Subject to any disclaimer, the term of this patent is extended or adjusted under 35 U.S.C. 154(b) by 146 days.

(21) Appl. No.: 13/654,288

(22) Filed: Oct. 17, 2012

(51) Int. Cl.
*G06F 12/02* (2006.01)

(52) U.S. Cl.
CPC ....... *G06F 12/0246* (2013.01); *G06F 12/0253* (2013.01); *G06F 2212/7201* (2013.01); *G06F 2212/7205* (2013.01); *G06F 2212/7211* (2013.01)

(58) Field of Classification Search
CPC .......... G06F 12/0246; G06F 12/0253; G06F 2212/7203; G06F 2212/1036; G06F 2212/1016; G06F 2212/7211; G06F 2212/7205
See application file for complete search history.

(56) References Cited

U.S. PATENT DOCUMENTS

| | | | |
|---|---|---|---|
| 6,065,020 A | 5/2000 | Dussud | |
| 6,856,556 B1 | 2/2005 | Hajeck | |
| 7,126,857 B2 | 10/2006 | Hajeck | |
| 7,363,421 B2 | 4/2008 | Di Sena et al. | |
| 7,412,585 B2 | 8/2008 | Uemura | |
| 7,430,136 B2 | 9/2008 | Merry, Jr. et al. | |
| 7,441,067 B2 | 10/2008 | Gorobets et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,509,471 B2 | 3/2009 | Gorobets | |
| 7,596,643 B2 | 9/2009 | Merry, Jr. et al. | |
| 7,610,438 B2 | 10/2009 | Lee et al. | |

(Continued)

OTHER PUBLICATIONS

L.Toker Garbage Collection and TRIM in SSDs Explained—An SSD Primer, The SSD Review, Apr. 16, 2012.*

(Continued)

*Primary Examiner* — David X Yi
*Assistant Examiner* — Francisco Grullon
(74) *Attorney, Agent, or Firm* — Wilmer Cutler Pickering Hale and Dorr LLP

(57) ABSTRACT

A data storage device may comprise non-volatile memory devices, each configured to store a plurality of physical pages, a controller and a first volatile memory configured to store a logical-to-physical address translation map that enables the controller to determine a physical location of logical pages. The controller may maintain, in the memory devices, a plurality of journals defining physical-to-logical page correspondences, each entry of which associating one or more physical pages to a logical page. Garbage collection may be carried out by reading entries of the journals; determining a validity of each logical page referenced by the read entries through a comparison with a corresponding entry in the map, the logical pages referenced by the read entries being stored in first physical pages; writing logical pages determined to be valid to second physical pages and updating the map accordingly; and designating at least the first physical pages as free space.

38 Claims, 15 Drawing Sheets

(56) References Cited

U.S. PATENT DOCUMENTS

| | | |
|---|---|---|
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,233 B2 | 4/2012 | Schibilla et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,417 B2 | 6/2013 | Goss et al. |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2004/0088474 A1 | 5/2004 | Lin |
| 2004/0109376 A1 | 6/2004 | Lin |
| 2006/0155917 A1 | 7/2006 | Di Sena et al. |
| 2007/0016721 A1* | 1/2007 | Gay ............................... 711/103 |
| 2007/0094445 A1 | 4/2007 | Trika et al. |
| 2007/0204128 A1 | 8/2007 | Lee et al. |
| 2007/0300037 A1 | 12/2007 | Rogers et al. |
| 2008/0104308 A1 | 5/2008 | Mo et al. |
| 2008/0256287 A1 | 10/2008 | Lee et al. |
| 2008/0282024 A1 | 11/2008 | Biswas et al. |
| 2009/0019218 A1* | 1/2009 | Sinclair et al. ............... 711/103 |
| 2009/0049229 A1 | 2/2009 | Honda et al. |
| 2009/0119353 A1 | 5/2009 | Oh et al. |
| 2009/0150599 A1 | 6/2009 | Bennett |
| 2009/0177931 A1 | 7/2009 | Song et al. |
| 2009/0216938 A1* | 8/2009 | Conley ............... G06F 12/0246 711/103 |
| 2009/0222643 A1 | 9/2009 | Chu |
| 2009/0240873 A1* | 9/2009 | Yu et al. ....................... 711/103 |
| 2009/0241008 A1 | 9/2009 | Kim et al. |
| 2009/0241009 A1 | 9/2009 | Kong et al. |
| 2009/0259805 A1 | 10/2009 | Kilzer et al. |
| 2009/0292972 A1 | 11/2009 | Seol et al. |
| 2009/0327589 A1* | 12/2009 | Moshayedi .................... 711/103 |
| 2010/0030999 A1 | 2/2010 | Hinz |
| 2010/0082886 A1* | 4/2010 | Kwon et al. .................. 711/103 |
| 2010/0174847 A1* | 7/2010 | Paley et al. .................... 711/103 |
| 2010/0174849 A1 | 7/2010 | Walston et al. |
| 2010/0174851 A1* | 7/2010 | Leibowitz et al. ............ 711/103 |
| 2010/0211851 A1 | 8/2010 | Dixon |
| 2010/0241928 A1 | 9/2010 | Kim et al. |
| 2010/0250793 A1 | 9/2010 | Syu |
| 2010/0268871 A1 | 10/2010 | Lee et al. |
| 2010/0306451 A1* | 12/2010 | Johnson ........................ 711/103 |
| 2011/0022778 A1* | 1/2011 | Schibilla ............. G06F 12/0246 711/103 |
| 2011/0055458 A1* | 3/2011 | Kuehne ............... G06F 12/0246 711/103 |
| 2011/0066788 A1 | 3/2011 | Eleftheriou et al. |
| 2011/0072194 A1 | 3/2011 | Forhan et al. |
| 2011/0072333 A1 | 3/2011 | Kuo |
| 2011/0099321 A1 | 4/2011 | Haines et al. |
| 2011/0099323 A1 | 4/2011 | Syu |
| 2011/0099350 A1 | 4/2011 | Feldman et al. |
| 2011/0119464 A1 | 5/2011 | Karr et al. |
| 2011/0185112 A1* | 7/2011 | Goss .................. G06F 12/0246 711/103 |
| 2011/0191566 A1 | 8/2011 | Takamiya et al. |
| 2011/0191654 A1 | 8/2011 | Rub |
| 2011/0225346 A1 | 9/2011 | Goss et al. |
| 2011/0252289 A1 | 10/2011 | Patapoutian et al. |
| 2011/0283049 A1 | 11/2011 | Kang et al. |
| 2011/0320915 A1 | 12/2011 | Khan |
| 2012/0023387 A1 | 1/2012 | Wang et al. |
| 2012/0072639 A1 | 3/2012 | Goss et al. |
| 2012/0072807 A1 | 3/2012 | Cornwell et al. |
| 2012/0173795 A1 | 7/2012 | Schuette et al. |
| 2012/0191936 A1 | 7/2012 | Ebsen et al. |
| 2012/0226887 A1 | 9/2012 | Culley et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290769 A1 | 11/2012 | Okubo et al. |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0208003 A1 | 7/2014 | Cohen |

(56) References Cited

U.S. PATENT DOCUMENTS

2014/0223255 A1    8/2014  Lu et al.
2014/0258769 A1    9/2014  Baryudin et al.

OTHER PUBLICATIONS

N. Agrawal, V. Prabhakaran, T. Wobber, J. D. Davis, M. Manasse, R. Panigrahy, Design Tradeoffs for SSD Performance, USENIX Jun. 2008.*

M. Wei, L. M. Grupp, F. E. Spada, S. Swanson, Reliably Erasing Data From Flash-Based Solid State Drives, FAST 2011.*

Jeong-Uk Kang & Heeseung Jo, et al., A Superblock-Based Flash Translation Layer for NAND Flash Memory, Proceedings of the 6th ACM & IEEE International Conference on Embedded Software, pp. 161-170, (Oct. 22-25, 2006).*

Written Opinion & International Search Report dated:Jan. 16, 2014 from Patent Application Serial No. PCT/US2013/062723 11 pages.

U.S. Appl. No. 13/651,313, filed Oct. 12, 2012 to Mullendore et al., 28 pages.

U.S. Appl. No. 13/594,696, filed Aug. 24, 2012 to Mullendore et al., 34 pages.

\* cited by examiner

| L-PAGE # | | | | E-PAGES NEEDED |
|---|---|---|---|---|
| L-Page 1 = | E-Page 1003 | Offset 800 | Len 1,624 | 1003, 1004 |
| L-Page 2 = | E-Page 1004 | Offset 400 | Len 696 | 1004 |
| L-Page 3 = | E-Page 1004 | Offset 1,120 | Len 4,096 | 1004, 1005, 1006 |
| L-Page 4 = | E-Page 1006 | Offset 1,144 | Len 3,128 | 1006, 1007, 1008 |

METHODS, DEVICES AND SYSTEMS FOR HARDWARE-BASED GARBAGE COLLECTION IN SOLID STATE DRIVES

BACKGROUND

Due to the nature of flash memory in solid state drives (SSDs), data is typically programmed by pages and erased by blocks. A page in an SSD is typically 8-16 kilobytes (KB) in size and a block consists of a large number of pages (e.g., 256 or 512). Thus, a particular physical location in an SSD (e.g., a page) cannot be directly overwritten without overwriting data in pages within the same block, as is possible in a magnetic hard disk drive. As such, address indirection is needed. Conventional data storage device controllers, which manage the flash memory on data storage devices such as SSDs and interface with the host system, use a Logical to Physical (L2P) mapping system known as Logical Block Addressing (LBA) that is part of the flash translation layer (FTL). When new data comes in replacing older data already written, the data storage device controller causes the new data to be written in a new location and update the logical mapping to point to the new physical location. Since the old physical location no longer holds valid data, it will eventually need to be erased before it can be written again.

Conventionally, a large L2P map table maps logical entries to physical address locations on an SSD. This large L2P map table, which may reside in a volatile memory such as dynamic random access memory (DRAM), is usually updated as writes come in, and saved to non-volatile memory in small sections. For example, if random writing occurs, although the system may have to update only one entry, it may nonetheless have to save to the non-volatile memory the entire table or a portion thereof, including entries that have not been updated, which is inherently inefficient.

FIG. 1 shows aspects of a conventional Logical Block Addressing (LBA) scheme for an SSD. As shown therein, a map table 104 contains one entry for every logical block 102 defined for the data storage device's flash memory 106. For example, a 64 GB SSD that supports 512 byte logical blocks may present itself to the host as having 125,000,000 logical blocks. One entry in the map table 104 contains the current location of each of the 125,000,000 logical blocks in the flash memory 106. In a conventional SSD, a flash page holds an integer number of logical blocks (i.e., a logical block does not span across flash pages). In this conventional example, an 8 KB flash page would hold 16 logical blocks (of size 512 bytes). Therefore, each entry in the logical-to-physical map table 104 contains a field 108 identifying the flash die on which the logical block is stored, a field 110 identifying the flash block on which the logical block is stored, another field 112 identifying the flash page within the flash block and a field 114 identifying the offset within the flash page that identifies where the logical block data begins in the identified flash page. The large size of the map table 104 prevents the table from being held inside the SSD controller. Conventionally, the large map table 104 is held in an external DRAM connected to the SSD controller. As the map table 104 is stored in volatile DRAM, it must be restored when the SSD powers up, which can take a long time, due to the large size of the table.

When a logical block is read, the corresponding entry in the map table 104 is read to determine the location in flash memory to be read. A read is then performed to the flash page specified in the corresponding entry in the map table 104. When the read data is available for the flash page, the data at the offset specified by the map entry is transferred from the SSD to the host. When a logical block is written, the corresponding entry in the map table 104 is updated to reflect the new location of the logical block. It is to be noted that when a logical block is written, the flash memory will initially contain at least two versions of the logical block; namely, the valid, most recently written version (pointed to by the map table 104) and at least one other, older version thereof that is stale and is no longer pointed to by any entry in the map table 104. These "stale" data are referred to as garbage, which occupies space that must be accounted for, collected, erased and made available for future use.

DETAILED DESCRIPTION

System Overview

Figure 1:
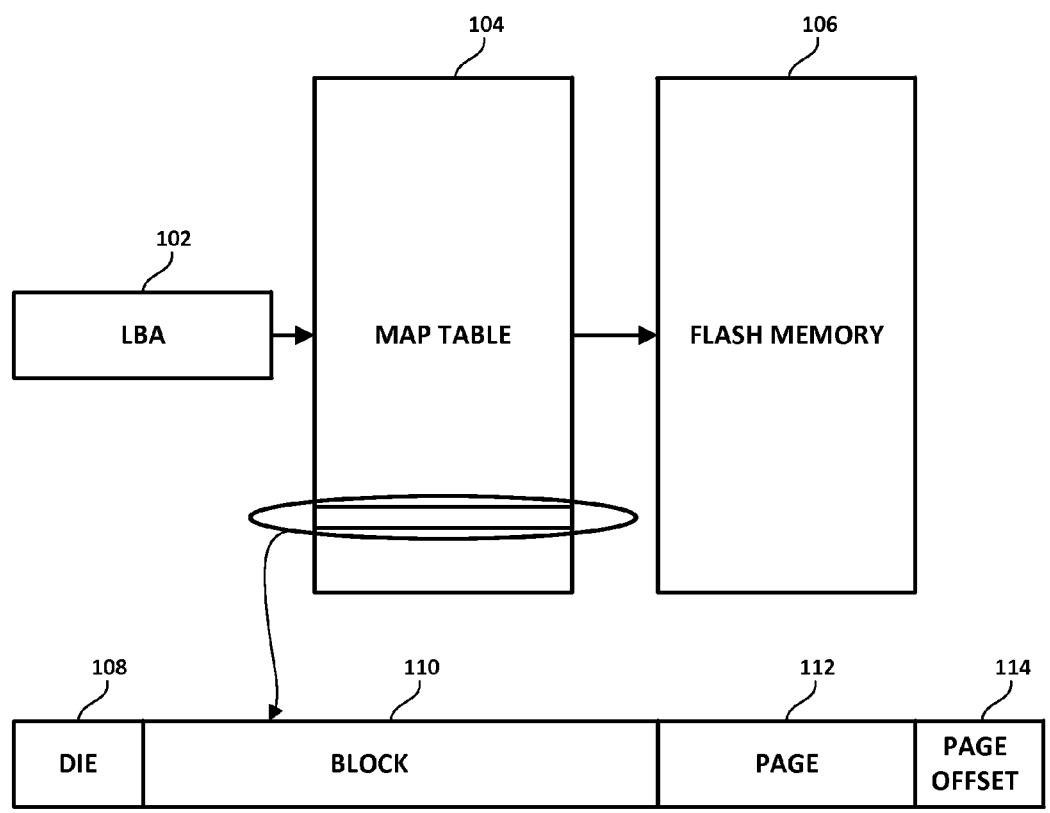
FIG. 1 shows aspects of a conventional Logical Block Addressing (LBA) scheme for SSDs.
Figure 2:
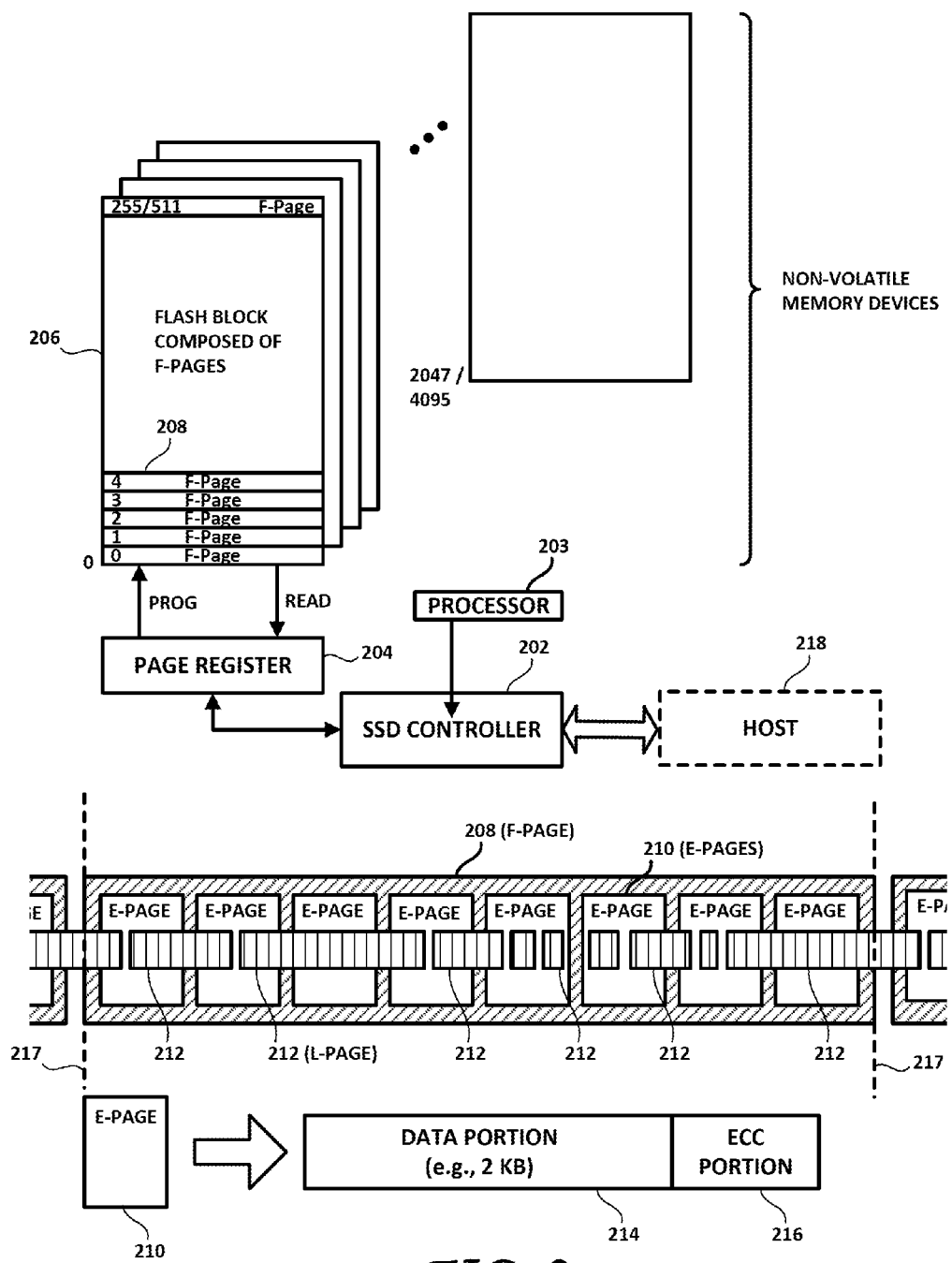
FIG. 2 is a diagram showing aspects of the physical and logical data organization of a data storage device according to one embodiment.

FIG. 2 is a diagram showing aspects of the physical and logical data organization of a data storage device according to one embodiment. In one embodiment, the data storage device is an SSD. In another embodiment, the data storage device is a hybrid drive including flash memory and rotating magnetic storage media. The disclosure is applicable to both SSD and hybrid implementations, but for the sake of simplicity the various embodiments are described with reference to SSD-based implementations. A data storage device controller 202 according to one embodiment may be configured to be coupled to a host, as shown at reference numeral 218. The controller 202 in one embodiment employs a hardware-based garbage collection scheme that offers performance advantages over a conventional firmware-based implementation, as will be further described with respect to FIGS. 10-20.

Returning to FIG. 2, the host 218 may utilize a logical block addressing (LBA) scheme. While the LBA size is normally fixed, the host can vary the size of the LBA dynamically. For example, the physical data storage device may be logically portioned to support partitions configured for LBAs of different sizes. However, such partitions are not required for the physical device to support LBAs of different sizes at the same time. For example, the LBA size may vary by interface and interface mode. Indeed, while 512 bytes is most common, 4 KB is also becoming more common, as are 512+(520, 528 etc.) and 4 KB+(4 KB+8, 4K+16 etc.) formats. As shown therein, the data storage device controller 202 may comprise or be coupled to a page register 204. The page register 204 may be configured to enable the controller 202 to read data from and store data to the data storage device. The controller 202 may be configured to program and read data from an array of flash memory devices responsive to data access commands from the host 218. While the description herein refers to flash memory generally, it is understood that the array of memory devices may comprise one or more of various types of non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The page register 204 may be configured to enable the controller 202 to read data from and store data to the array. According to one embodiment, the array of flash memory devices may comprise a plurality of non-volatile memory devices in die (e.g., 128 dies), each of which comprises a plurality of blocks, such as shown at 206 in FIG. 2. Other page registers 204 (not shown), may be coupled to blocks on other die. A combination of flash blocks, grouped together, may be called a Superblock or S-Block. In some embodiments, the individual blocks that form an S-Block may be chosen from one or more dies, planes or other levels of granularity. An S-Block, therefore, may comprise a plurality of flash blocks, spread across one or more die, that are combined together. In this manner, the S-Block may form a unit on which the Flash Management System (FMS) operates. In some embodiments, the individual blocks that form an S-Block may be chosen according to a different granularity than at the die level, such as the case when the memory devices include dies that are sub-divided into structures such as planes (i.e., blocks may be taken from individual planes). According to one embodiment, allocation, erasure and garbage collection may be carried out at the S-Block level. In other embodiments, the FMS may perform data operations according to other logical groupings such as pages, blocks, planes, dies, etc.

In turn, each of the flash blocks 206 comprises a plurality of flash pages (F-Pages) 208. Each F-Page may be of a fixed size such as, for example, 16 KB. The F-Page, according to one embodiment, is the size of the minimum unit of program for a given flash device. As also shown in FIG. 2, each F-Page 208 may be configured to accommodate a plurality of physical pages, hereinafter referred to as E-Pages 210. The term "E-Page" refers to a data structure stored in flash memory on which an error correcting code (ECC) has been applied. According to one embodiment, the E-Page 210 may form the basis for physical addressing within the data storage device and may constitute the minimum unit of flash read data transfer. The E-Page 210, therefore, may be (but need not be) of a predetermined fixed size (such as 2 KB, for example) and determine the size of the payload (e.g., host data) of the ECC system. According to one embodiment, each F-Page 208 may be configured to fit a predetermined plurality of E-Pages 210 within its boundaries. For example, given 16 KB size F-Pages 208 and a fixed size of 2 KB per E-Page 210, eight E-Pages 210 fit within a single F-Page 208, as shown in FIG. 2. In any event, according to one embodiment, a power of 2 multiple of E-Pages 210, including ECC, may be configured to fit into an F-Page 208. Each E-Page 210 may comprise a data portion 214 and, depending on where the E-Page 210 is located, may also comprise an ECC portion 216. Neither the data portion 214 nor the ECC portion 216 need be fixed in size. The address of an E-Page uniquely identifies the location of the E-Page within the flash memory. For example, the E-Page's address may specify the flash channel, a particular die within the identified flash channel, a particular block within the die, a particular F-Page and, finally, the E-Page within the identified F-Page.

To bridge between physical addressing on the data storage device and logical block addressing by the host, a logical page (L-Page) construct is introduced. An L-Page, denoted in FIG. 2 at reference numeral 212 may comprise the minimum unit of address translation used by the FMS. Each L-Page, according to one embodiment, may be associated with an L-Page number. The L-Page numbers of L-Pages 212, therefore, may be configured to enable the controller 202 to logically reference host data stored in one or more of the physical pages, such as the E-Pages 210. The L-Page 212 may also be utilized as the basic unit of compression. According to one embodiment, unlike F-Pages 208 and E-Pages 210, L-Pages 212 are not fixed in size and may vary in size, due to variability in the compression of data to be stored. Since the compressibility of data varies, a 4 KB amount of data of one type may be compressed into a 2 KB L-Page while a 4 KB amount of data of a different type may be compressed into a 1 KB L-Page, for example. Due to such compression, therefore, the size of L-Pages may vary within a range defined by a minimum compressed size of, for example, 24 bytes to a maximum uncompressed size of, for example, 4 KB or 4 KB+. Other sizes and ranges may be implemented. As shown in FIG. 2, L-Pages 212 need not be aligned with the boundaries of E-Page 210. Indeed, L-Pages 212 may be configured to have a starting address that is aligned with an F-Page 208 and/or E-Page 210 boundary, but also may be configured to be unaligned with either of the boundaries of an F-Page 208 or E-Page 210. That is, an L-Page starting address may be located at a non-zero offset from either the start or ending addresses of the F-Pages 208 or the start or ending addresses of the E-Pages 210, as shown in FIG. 2. As the L-Pages 212 are not fixed in size and may be smaller than the fixed-size E-Pages 210, more than one L-Page 212 may fit within a single E-Page 210. Similarly, as the L-Pages 212 may be larger in size than the E-Pages 210, L-Pages 212 may span more than one E-Page, and may even cross the boundaries of F-Pages 210, shown in FIG. 2 at numeral 217.

For example, where the LBA size is 512 or 512+ bytes, a maximum of, for example, eight sequential LBAs may be packed into a 4 KB L-Page 212, given that an uncompressed L-Page 212 may be 4 KB to 4 KB+. It is to be noted that, according to one embodiment, the exact logical size of an L-Page 212 is unimportant as, after compression, the physical size may span from few bytes at minimum size to thousands of bytes at full size. For example, for a 4 TB SSD device, 30 bits of addressing may be used to address each L-Page 212 to cover for an amount of L-Pages that could potentially be present in such a SSD.

Figure 3:
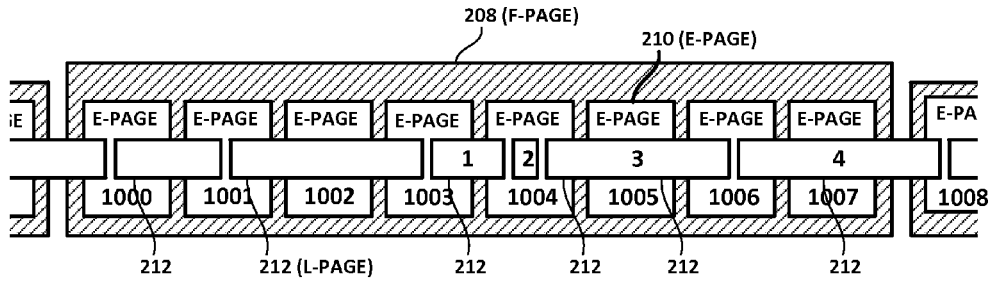
FIG. 3 shows a logical-to-physical address translation map and illustrative entries thereof, according to one embodiment.
Figure 3:
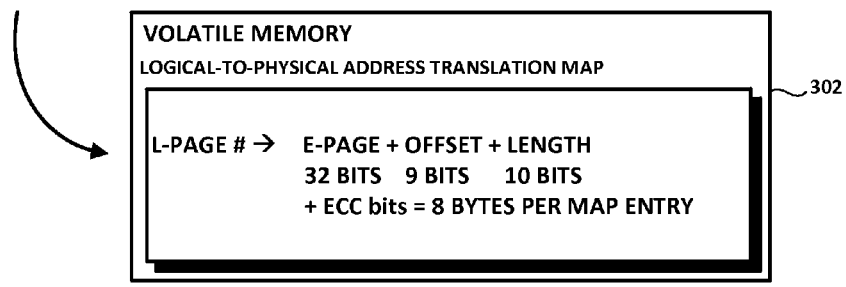

FIG. 3 shows a logical-to-physical address translation map and illustrative entries thereof, according to one embodiment. As the host data is referenced by the host in L-Pages 212 and as the data storage device stores the L-Pages 212 in one or more contiguous E-Pages 210, a logical-to-physical address translation map is required to enable the controller 202 to associate an L-Page number of an L-Page 212 to one or more E-Pages 210. Such a logical-to-physical address translation map is shown in FIG. 3 at 302 and, in one embodiment, is a linear array having one entry per L-Page 212. Such a logical-to-physical address translation map 302 may be stored in a volatile memory, such as a DRAM or SRAM. FIG. 3 also shows the entries in the logical-to-physical address translation map for four different L-Pages 212, which L-Pages 212 in FIG. 3 are associated with L-Page numbers denoted as L-Page 1, L-Page 2, L-Page 3 and L-Page 4. According to one embodiment, each L-Page stored in the data storage device may be pointed to by a single and unique entry in the logical-to-physical address translation map 302. Accordingly, in the example being developed herewith, four entries are shown. As shown at 302, each entry in the map 302 may comprise information for an L-Page that is indexed by an L-Page number. That information may comprise an identification of the physical page (e.g., E-Page) containing the start address of the L-Page being referenced, the offset of the start address within the physical page (e.g., E-Page) and the length of the L-Page. In addition, a plurality of ECC bits may provide error correction functionality for the map entry. For example, and as shown in FIG. 3, and assuming an E-Page size of 2 KB, L-Page 1 may be referenced in the logical-to-physical address translation map 302 as follows: E-Page 1003, offset 800, length 1624, followed by a predetermined number of ECC bits (not shown). That is, in physical address terms, the start of L-Page 1 is within (not aligned with) E-Page 1003, and is located at an offset from the starting physical location of the E-Page 1003 that is equal to 800 bytes. Compressed L-Page 1, furthermore, extends 1,624 bytes, thereby crossing an E-Page boundary to E-Page 1004. Therefore, E-Pages 1003 and 1004 each store a portion of the L-Page 212 denoted by L-Page number L-Page 1. Similarly, the compressed L-Page referenced by L-Page number L-Page 2 is stored entirely within E-Page 1004, and begins at an offset therein of 400 bytes and extends only 696 bytes within E-Page 1004. The compressed L-Page associated with L-Page number L-Page 3 starts within E-Page 1004 at an offset of 1,120 bytes and extends 4,096 bytes past E-Page 1005 and into E-Page 1006. Therefore, the L-Page associated with L-Page number L-Page 3 spans a portion of E-Page 1004, all of E-Page 1005 and a portion of E-Page 1006. Finally, the L-Page associated with L-Page number L-Page 4 begins within E-Page 1006 at an offset of 1,144 bytes, and extends 3,128 bytes to fully span E-Page 1007, crossing an F-Page boundary into E-Page 1008 of the next F-Page. In one embodiment, there may be 24 bytes (as reflected in the example being developed) of metadata included in each L-Page that are not included in the length specified. In other embodiments, the metadata may be included in the L-Page length.

Collectively, each of these constituent identifier fields (E-Page, offset, length and ECC) making up each entry of the logical-to-physical address translation map 302 may be, for example, 8 bytes in size. That is, for an exemplary 4 TB drive, the address of the E-Page may be 32 bits in size, the offset may be 12 bits (for E-Page data portions up to 4 KB) in size, the length may be 10 bits in size and the ECC field may be provided. Other organizations and bit-widths are possible. Such an 8 byte entry may be created each time an L-Page is written or modified, to enable the controller 202 to keep track of the host data, written in L-Pages, within the flash storage. This 8-byte entry in the logical-to-physical address translation map may be indexed by an L-Page number or LPN. In other words, according to one embodiment, the L-Page number functions as an index into the logical-to-physical address translation map 302. It is to be noted that, in the case of a 4 KB sector size, the LBA is the same as the LPN. The LPN, therefore, may constitute the address of the entry within the volatile memory. When the controller 202 receives a read command from the host 218, the LPN may be derived from the supplied LBA and used to index into the logical-to-physical address translation map 302 to extract the location of the data to be read in the flash memory. When the controller 202 receives a write command from the host, the LPN may be constructed from the LBA and the logical-to-physical address translation map 302 may be modified. For example, a new entry therein may be created. Depending upon the size of the volatile memory storing the logical-to-physical address translation map 302, the LPN may be stored in a single entry or broken into, for example, a first entry identifying the E-Page containing the starting address of the L-Page in question (plus ECC bits) and a second entry identifying the offset and length (plus ECC bits). According to one embodiment, therefore, these two entries may together correspond and point to a single L-Page within the flash memory. In other embodiments, the specific format of the logical-to-physical address translation map entries may be different from the examples shown above.

S-Journals and S-Journal Map

As the logical-to-physical address translation map 302 may be stored in a volatile memory, it may need to be rebuilt upon startup or any other loss of power to the volatile memory. This, therefore, requires some mechanism and information to be stored in a non-volatile memory that will enable the controller 202 to reconstruct the logical-to-physical address translation map 302 before the controller can "know" where the L-Pages are stored in the non-volatile memory after startup or after a power-fail event. According to one embodiment, such mechanism and information are embodied in a construct that may be called a System Journal, or S-Journal. According to one embodiment, the controller 202 may be configured to maintain, in the plurality of non-volatile memory devices (e.g., in one or more of the blocks 206 in one or more die, channel or plane), a plurality of S-Journals defining physical-to-logical address correspondences. According to one embodiment, each S-Journal covers a predetermined range of physical pages (e.g., E-Pages). According to one embodiment, each S-Journal may comprise a plurality of journal entries, with each entry being configured to associate one or more physical pages, such as E-Pages, to the L-Page number of each L-Page. According to one embodiment, each time the controller 202 restarts or whenever the logical-to-physical address translation map 302 is to be rebuilt either partially or entirely, the controller 202 reads the S-Journals and, from the information read from the S-Journal entries, rebuilds the logical-to-physical address translation map 302.

Figure 4:
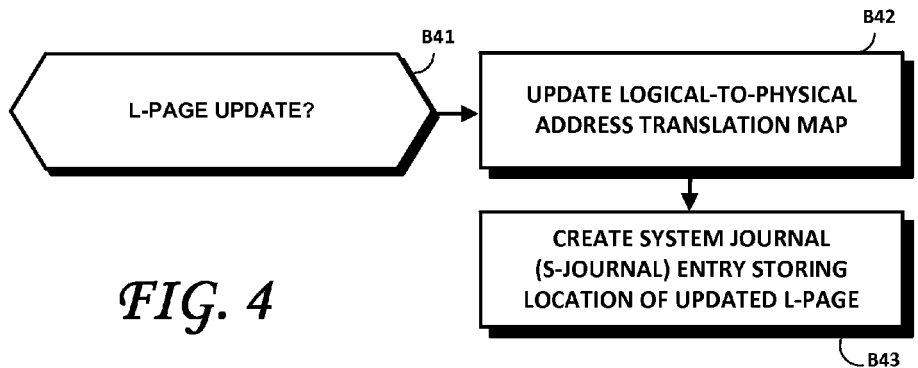
FIG. 4 shows aspects of a method for updating a logical-to-physical address translation map and for creating an S-Journal entry, according to one embodiment.

FIG. 4 shows aspects of a method for updating a logical-to-physical address translation map and for creating an S-Journal entry, according to one embodiment. As shown therein, to ensure that the logical-to-physical address translation map 302 is kept up-to-date, whenever an L-Page is written or otherwise updated as shown at block B41, the logical-to-physical address translation map 302 may be updated as shown at B42. As shown at B43, an S-Journal entry may also be created, storing therein information pointing to the location of the updated L-Page. In this manner, both the logical-to-physical address translation map 302 and the S-Journals are updated when new writes occur (e.g., as the host issues writes to non-volatile memory, as garbage collection/wear leveling occurs, etc.). Write operations to the non-volatile memory devices to maintain a power-safe copy of address translation data may be configured, therefore, to be triggered by newly created journal entries (which may be just a few bytes in size) instead of re-saving all or a portion of the logical-to-physical address translation map, such that Write Amplification (WA) is reduced. The updating of the S-Journals ensures that the controller 202 can access a newly updated L-Page and that the logical-to-physical address translation map 302 may be reconstructed upon restart or other information-erasing power event affecting the volatile memory in which the logical-to-physical address translation map is stored. Moreover, in addition to their utility in rebuilding the logical-to-physical address translation map 302, the S-Journals are useful in enabling effective Garbage Collection (GC). Indeed, the S-Journals may contain the last-in-time update to all L-Page numbers, and also may contain stale entries, entries that do not point to a valid L-Page.

Figure 5:
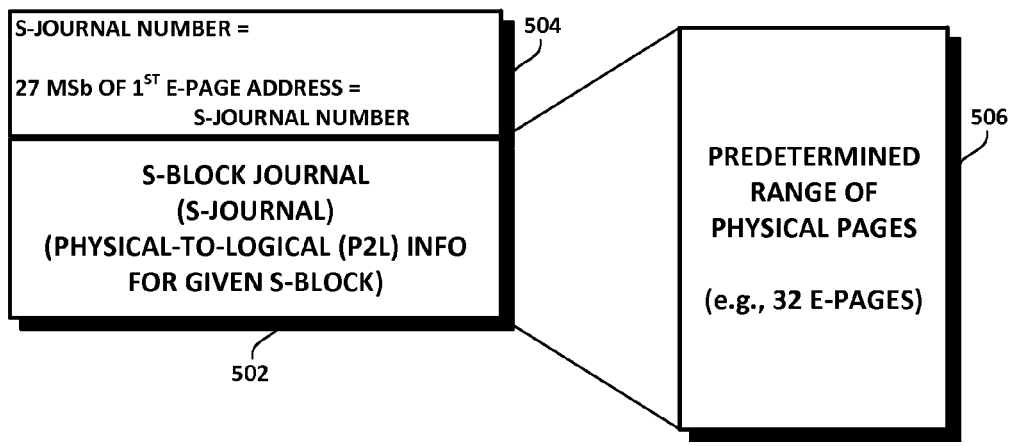
FIG. 5 is a block diagram of an S-Journal, according to one embodiment.

According to one embodiment, the S-Journal may be the main flash management data written to the non-volatile memory. S-Journals may contain mapping information for a given S-Block and may contain the Physical-to-Logical (P2L) information for a given S-Block. FIG. 5 is a block diagram showing aspects of an S-Journal, according to one embodiment. As shown therein, each S-Journal 502 covers a predetermined physical region of the non-volatile memory such as, for example, 32 E-Pages as shown at 506, which are addressable using 5 bits. Each S-Journal 502 may be identified by an S-Journal Number, which may be part of a header 504 that could include other information about the S-Journal. The S-Journal Number may comprise a portion of the address of the first physical page covered by the S-Journal. For example, the S-Journal Number of S-Journal 502 may comprise, for example, the 27 Most Significant Bits (MSb) of the first E-Page address covered by this S-Journal 502.

Figure 6:
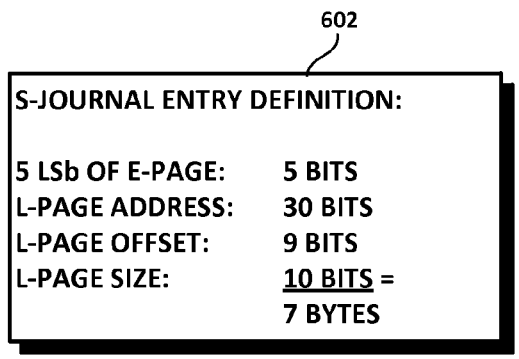
FIG. 6 shows an exemplary organization of one entry of an S-Journal, according to one embodiment.

FIG. 6 shows an exemplary organization of one entry 602 of an S-Journal 502, according to one embodiment. Each entry 602 of the S-Journal 502 may point to the starting address of one L-Page, which is physically addressed in E-Pages. Each entry 602 may comprise, for example, a number (5, for example) of Least Significant Bits (LSbs) of the address of the E-Page containing the start L-Page. The full E-Page address is obtained by concatenating these 5 LSbs with the 27 MSbs of the S-Journal Number in the header 504. In addition, the entry 602 may comprise the L-Page number, its offset within the identified E-Page and its size. For example, each entry 602 of an S-Journal may comprise the 5 LSbs of the address of first E-Page covered by this S-Journal entry, 30 bits of L-Page number, 9 bits of E-Page offset and 10 bits of L-Page size, adding up to an overall size of about 7 bytes. Various other internal journal entry formats may be used in other embodiments.

According to one embodiment, due to the variability in the compression or the host configuration of the data stored in L-Pages, a variable number of L-Pages may be stored in a physical area, such as a physical area equal to 32 E-Pages, as shown at 506. As a result of the use of compression and the consequent variability in the sizes of L-Pages, S-Journals may comprise a variable number of entries. For example, according to one embodiment, at maximum compression, an L-Page may be 24 bytes in size and an S-Journal may comprise over 2,500 entries, referencing an equal number of L-Pages, one L-Page per S-Journal entry 602.

Figure 7:
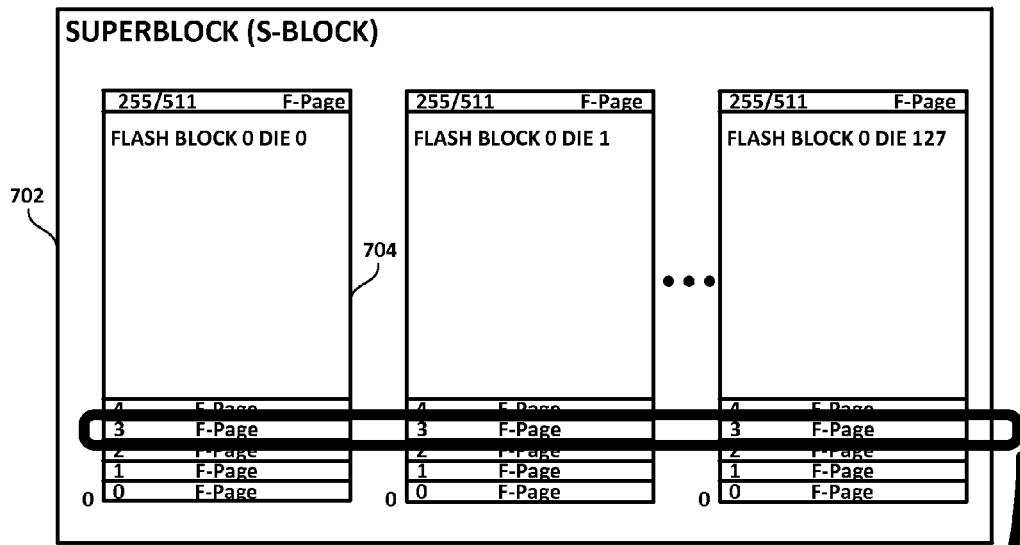
FIG. 7 is a block diagram of a superblock (S-Block), according to one embodiment.
Figure 8:
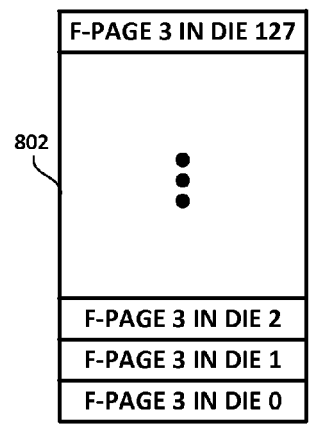
FIG. 8 shows another view of a super page (S-Page), according to one embodiment.

As noted above, an S-Journal may be configured to contain mapping information for a given S-Block. More precisely, according to one embodiment, S-Journals contain the mapping information for a predetermined range of E-Pages within a given S-Block. FIG. 7 is a block diagram of a S-Block, according to one embodiment. As shown therein, an S-Block 702 may comprise one flash block (F-Block) 704 (as also shown at 206 in FIG. 2) per die. An S-Block, therefore, may be thought of as a collection of F-Blocks, one F-Block per die, that are combined together to form a unit of the Flash Management System. According to one embodiment, allocation, erasure and GC may be managed at the S-Block level. Each F-Block 704, as shown in FIG. 7, may comprise a plurality of flash pages (F-Page) such as, for example, 256 or 512 F-Pages. An F-Page, according to one embodiment, may be the size of the minimum unit of program for a given non-volatile memory device. FIG. 8 shows a super page (S-page), according to one embodiment. As shown therein, an S-Page 802 may comprise one F-Page per F-Block of an S-Block, meaning that an S-Page spans across an entire S-Block.

Relationships Among Various Data Structures

Figure 9A:
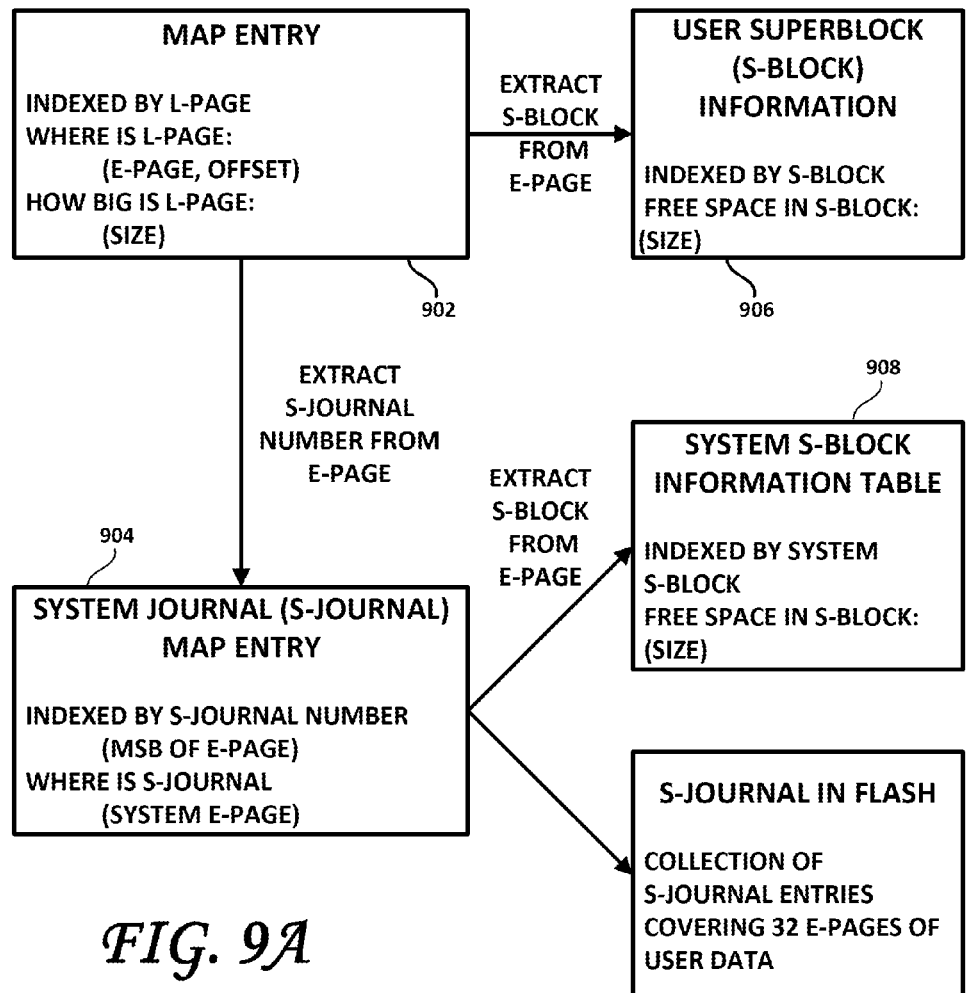
FIG. 9A shows relationships among the logical-to-physical address translation map, S-Journals and S-Blocks, according to one embodiment.

FIG. 9A shows relationships among the logical-to-physical address translation map, the S-Journal map and S-Blocks, according to one embodiment. Reference 902 denotes an entry in the logical-to-physical address translation map (stored in DRAM in one embodiment). According to one embodiment, the logical-to-physical address translation map may be indexed by L-Page number, in that there may be one entry 902 per L-Page in the logical-to-physical address translation map. The physical address of the start of the L-Page in the flash memory and the size thereof may be given in the map entry 902; namely by E-Page address, offset within the E-Page and the size of the L-Page. As noted earlier, the L-Page, depending upon its size, may span one or more E-Pages and may span F-Pages and F-Blocks as well.

As shown at 904, the volatile memory (e.g., DRAM) may also store a System Journal (S-Journal) map. An entry 904 in the S-Journal map stores information related to where an S-Journal is physically located in the non-volatile memory. For example, the 27 MSbs of the E-Page physical address where the start of the L-Page is stored may constitute the S-Journal Number (as previously shown in FIG. 5). The S-Journal map entry 904 in the volatile memory may also include the address of the S-Journal in non-volatile memory, referenced in system E-Pages. From the S-Journal map entry 904 in volatile memory, System S-Block Information 908 may be extracted. The System S-Block Information 908 may be indexed by System S-Block (S-Block in the System Band) and may comprise, among other information regarding the S-Block, the size of any free or used space in the System S-Block. Also from the S-Journal map entry 904, the physical location (expressed in terms of E-Pages in the System Band) of the referenced S-Journal in non-volatile memory 910 may be extracted.

The System Band, according to one embodiment, does not contain L-Page data and may contain File Management System (FMS) meta-data and information. The System Band may be configured as lower page only for reliability and power fail simplification. During normal operation, the System Band need not be read except during garbage collection. The System Band may be provided with significantly higher overprovisioning than the data band for overall WA optimization. Other bands include the Hot Band, which may contain L-Page data and is frequently updated, and the Cold Band, which may be less frequently updated and may comprise more static data, such as data that may have been collected as a result of GC. According to one embodiment, the System, Hot and Cold Bands may be allocated by an S-Block basis.

As noted above, each of these S-Journals in non-volatile memory may comprise a collection of S-Journal entries and cover, for example, 32 E-Pages worth of data. These S-Journals in non-volatile memory 910 enable the controller 202 to rebuild not only the logical-to-physical address translation map in volatile memory, but also the S-Journal map, the User S-Block Information 906, and the System S-Block Information 908, in volatile memory.

Figure 9B:
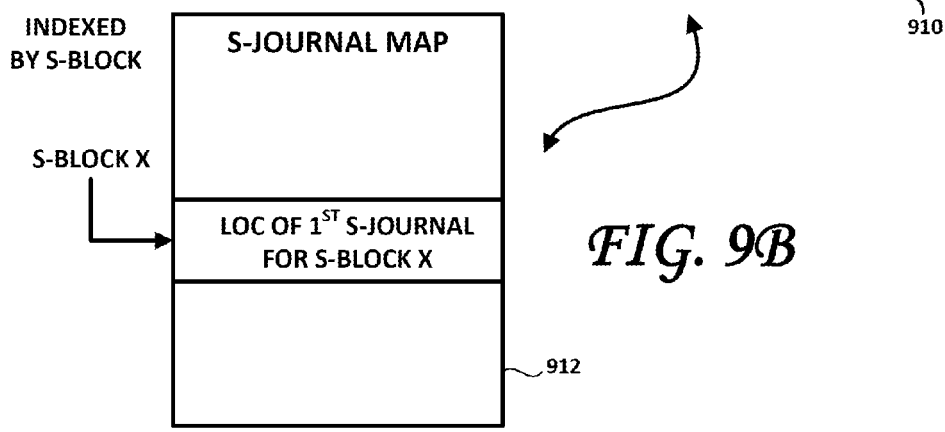
FIG. 9B is a block diagram of an S-Journal Map, according to one embodiment.

FIG. 9B is a block diagram of an S-Journal Map 912, according to one embodiment. The S-Journal Map 912 may be indexed by S-Block number and each entry thereof may point to the start of the first S-Journal for that S-Block which, in turn, may cover a predetermined number of E-Pages (e.g., 32) of that S-Block. The controller 202 may be further configured to build or rebuild a map of the S-Journals and store the resulting S-Journal Map in volatile memory. That is, upon restart or upon the occurrence of another event in which power fails or after a restart subsequent to error recovery, the controller 202 may read the plurality of S-Journals in a predetermined sequential order, build a map of the S-Journals stored in the non-volatile memory devices based upon the sequentially read plurality of S-Journals, and store the built S-Journal Map 912 in the volatile memory.

Garbage Collection of User Data S-Blocks

FIGS. 10-13 are block diagrams illustrating aspects of garbage collection, according to one embodiment. In one embodiment, at least a part of the described garbage collection operation is performed in hardware. As shown therein, the data in the User S-Block Information 906 may be scanned to select the "best" S-Block to garbage collect. There are a number of criteria that may be evaluated to select which S-Block to garbage collect. For example, the best S-Block to garbage collect may be that S-Block having the largest amount of free space and the lowest Program Erase (PE) count. Alternatively, these and/or other criteria may be weighted to select the S-Block to be garbage collected. For purposes of example, the S-Block selected to be garbage collected in FIGS. 10-13 is S-Block 15, which is referenced by information entry 15 within the User S-Block Information 906, showing some amount+3,012 bytes of free space (the additional 3,012 bytes to account for the recently obsoleted L-Page 100). It is to be noted that the User S-Block Information 906 may comprise, among other items of information, a running count of the number of PE cycles undergone by each tracked S-Block, which may be evaluated in deciding which S-Block to garbage collect. As shown at 1008, S-Block 15 has a mix of valid data (hashed blocks) and invalid data (non-hashed blocks).

Figure 10:
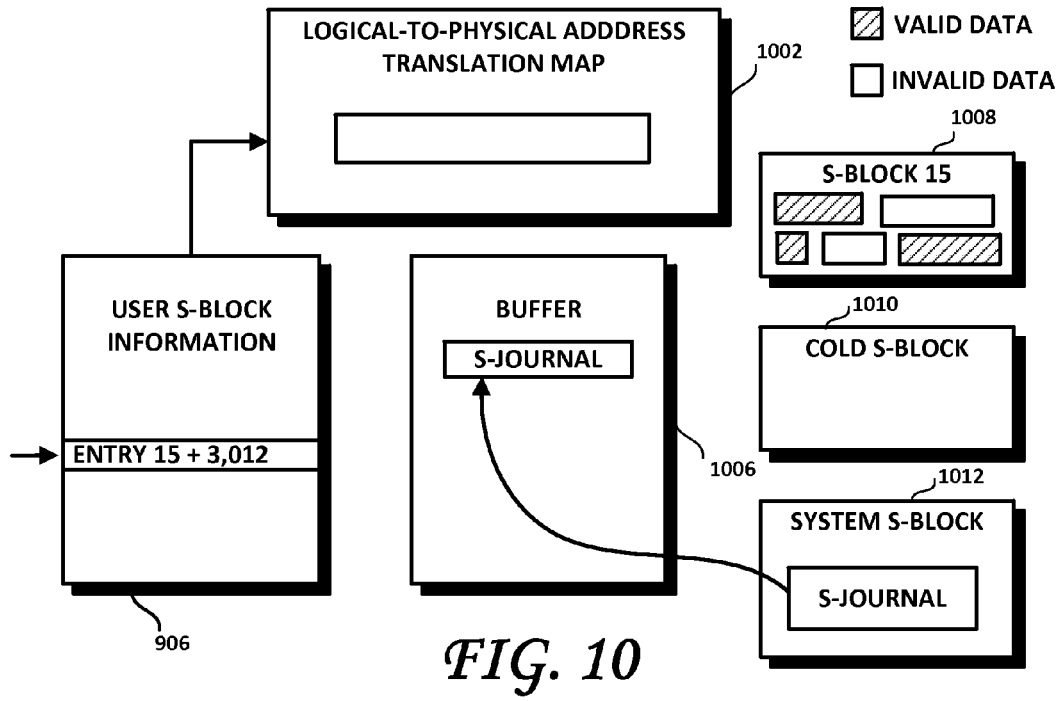
FIG. 10 is a block diagram illustrating aspects of garbage collection, according to one embodiment.

Now that S-Block 15 has been selected for GC, the S-Journal Map (see 912 in FIG. 9B) may be consulted (e.g., indexed into by the S-Block number) to find the location in non-volatile memory (e.g., E-Page address) of the corresponding S-Journals for that S-Block. To illustrate an example, one S-Journal pointed to by the S-Journal Map 912 is located using the S-Journal Number (27 MSb of E-Page address), and read into the buffer 1006, as shown in FIG. 10. That is, the one or more E-Pages in the System S-Block 1012 pointed to by S-Journal Map 912 are accessed and the S-Journal stored beginning at that location may be read into the buffer 1006. In one embodiment, the S-Journal map also contains the length of the S-Journal since an S-Journal may span one or more E-Pages. An S-Journal may be quite large and, therefore, may be read in pieces and processed as available.

Thereafter, each P2L entry in the S-Journal in the buffer 1006 may then be compared to the corresponding entry in the logical-to-physical address translation map 1002. For each entry in the S-Journal in the buffer 1006, it may be determined whether the physical address for the L-Page of that entry matches the physical address of the same L-Page in the corresponding entry in the logical-to-physical address translation map 1002. If the two match, that entry in the S-Journal is valid. Conversely, if the address for the L-Page in the S-Journal does not match the entry for that L-Page in the logical-to-physical address translation map, that entry in the S-Journal is not valid.

Figure 11:
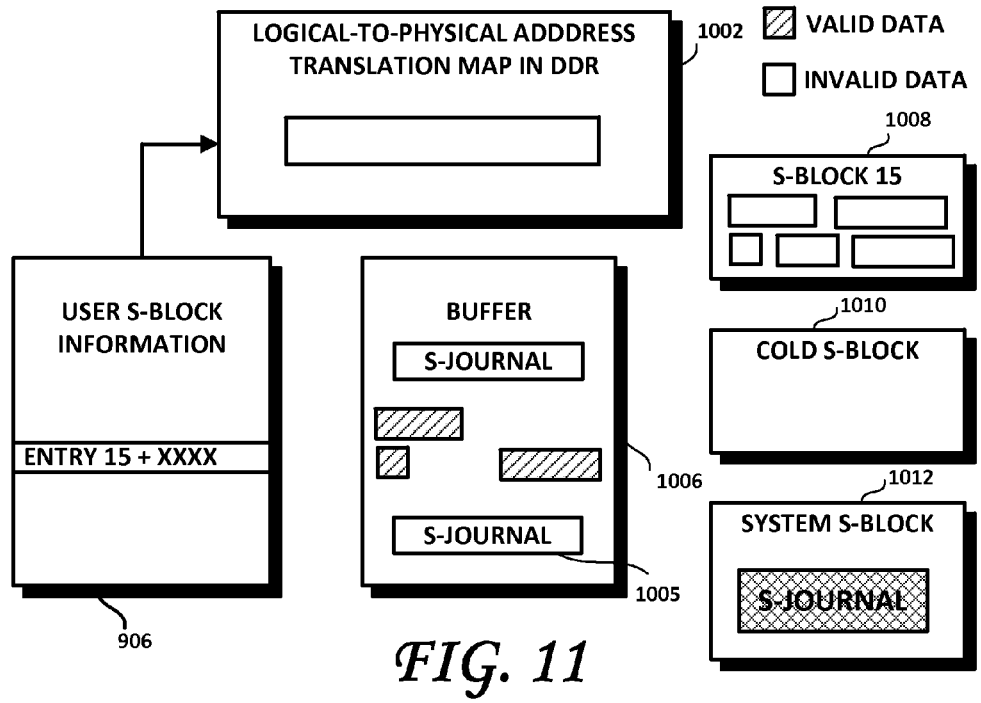
FIG. 11 is a block diagram illustrating further aspects of garbage collection, according to one embodiment.

According to one embodiment, as valid entries are found in the S-Journal whose entries are being parsed and compared, the referenced L-Pages may be read out of S-Block 15 and written to the buffer 1006, as shown in FIG. 11. The same process may be used for other S-Journals covering S-Block 15 until the entire S-Block is processed. As also shown in FIG. 11 at reference 1008, S-Block 15 now contains only invalid data. This is because the data indicated as valid by entries in S-Journals for S-Block 15 have been preserved and will soon be moved to a new S-Block. In the illustrated example, as the entries in the example S-Journal of S-Block 15 in System S-Block 1012 point to such invalid data, that S-Journal is shown as being hashed, indicating that it is now stale. The logical-to-physical address translation map 1002 may then be updated, generating a new E-Page starting address for the valid data read into the buffer 1006. It is to be noted that during the update of the logical-to-physical address translation map, the map may be rechecked for valid entries and may be locked during the map update process to guarantee atomicity. The valid data will also necessitate new S-Journal entries be generated in S-Journal 1005, which in one embodiment is for the Cold S-Block 1010.

Figure 12:
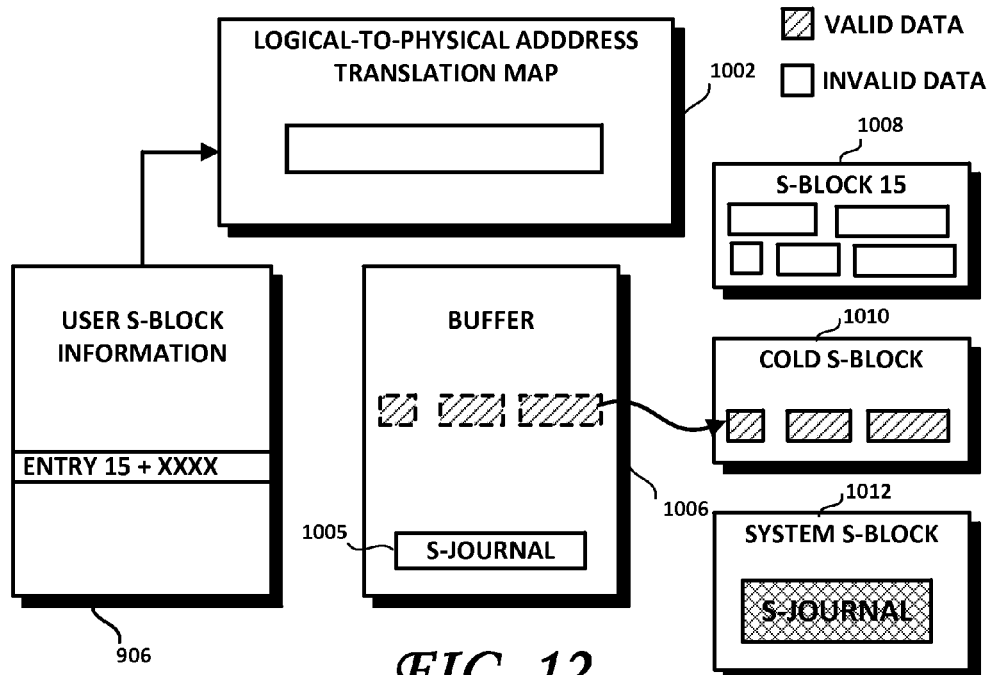
FIG. 12 is a block diagram illustrating still further aspects of garbage collection, according to one embodiment.
Figure 13:
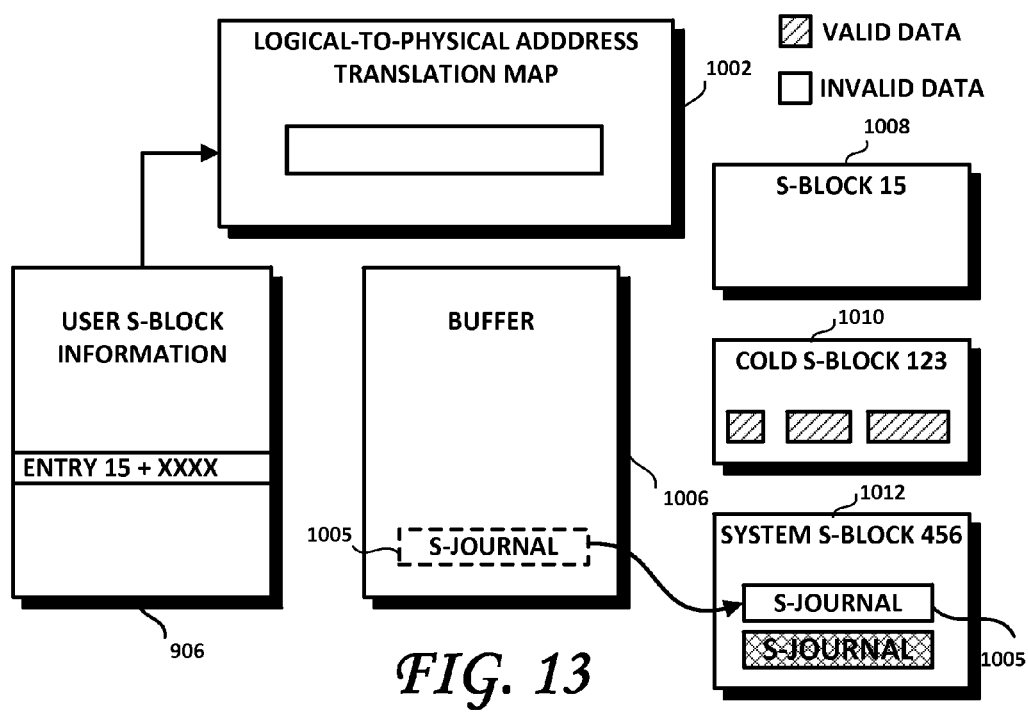
FIG. 13 is a block diagram illustrating yet further aspects of garbage collection, according to one embodiment.
Figure 14:
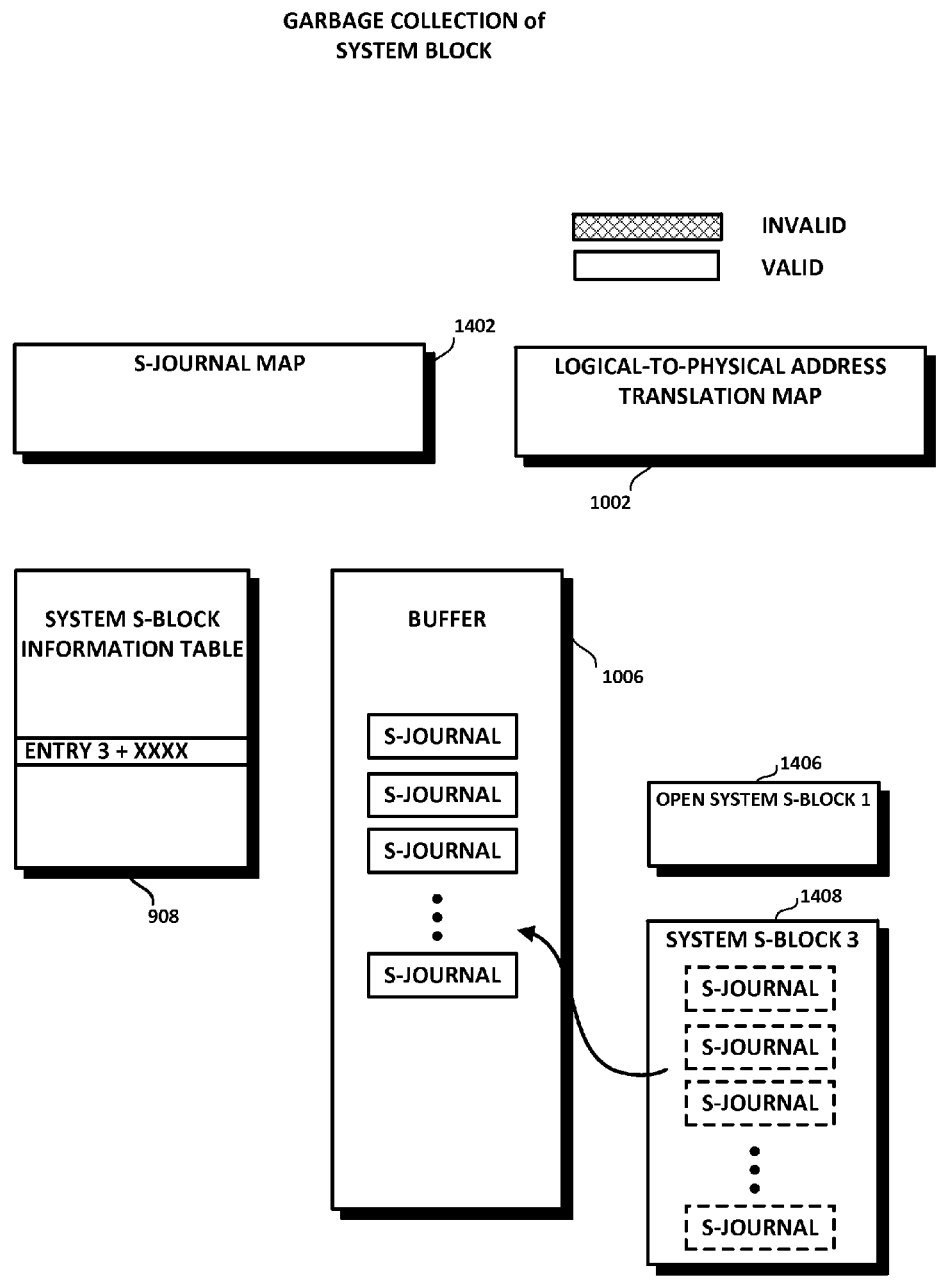
FIG. 14 is a block diagram illustrating aspects of garbage collecting a system block, according to one embodiment.

In one embodiment, the valid data may then be written out to the Cold S-Block 1010 (the Hot S-Block being used for recently written host data, not garbage collected data), as shown at FIG. 12. At some later time (e.g., after a sufficient number of entries have been populated), S-Journal 1005 may be written out to the System S-Block 1012 in the System Band, as shown in FIG. 13. S-Block 15 has now been garbage collected and User S-Block Information 906 now indicates that the entire S-Block 15 is free space. S-Block 15 may thereafter be erased, its PE count updated and made available for new writes. It is to be noted that an invalid S-Journal is still present in System S-Block 1012. The space in flash memory in the System Band occupied by this invalid S-Journal may be garbage collected at some later time.

Garbage Collection on System S-Blocks

FIGS. 14-18 are block diagrams illustrating aspects of garbage collecting a system block, according to one embodiment. In the example being developed in FIGS. 14-18, it is assumed that System S-Block 3, shown at referenced 1408 in FIG. 14, has been picked for garbage collection. Once a System S-Block has been picked, all of the E-pages (and by extension, all S-Journals contained therein) within the picked System S-Block may be read (sequentially or non-sequentially) into the buffer 1006.

Figure 15:
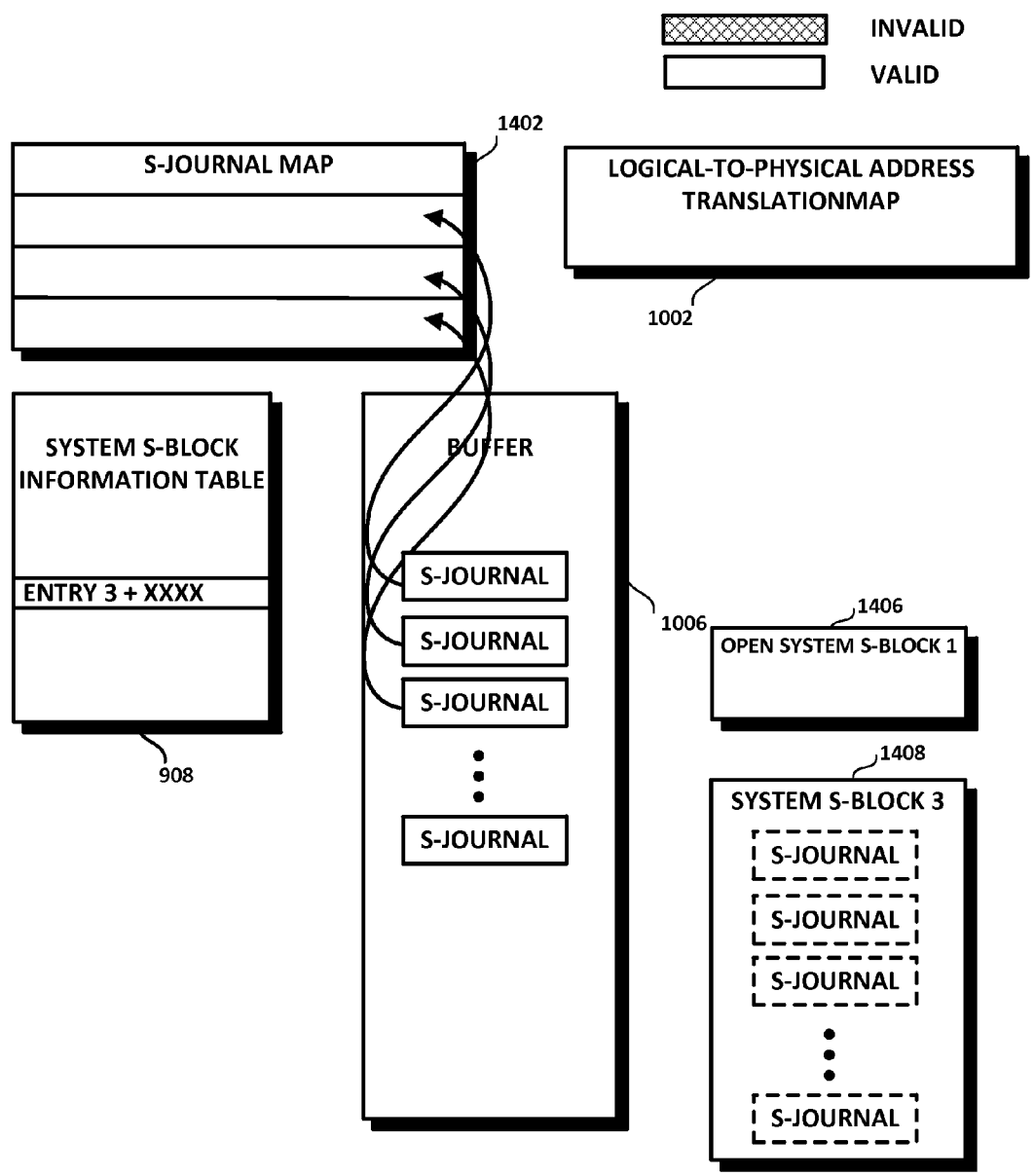
FIG. 15 is a block diagram illustrating further aspects of garbage collecting a system block, according to one embodiment.

As suggested in FIG. 15, the S-Journal numbers for one or more of the S-Journals read into the buffer 1006 may then be extracted from the headers of the S-Journals. Each such System S-Journal number may then be used to look up in the S-Journal Map 1402 to determine whether the corresponding S-Journal is still valid. According to one embodiment, invalid S-Journals are those S-Journals whose S-Journal number is not matched by a corresponding entry in the S-Journal Map 1402, which has the most updated information on where S-Journals are physically stored. For example, if the entry in the S-Journal Map 1402 for S-Journal Number "12345" points to an E-Page within another System S-Block, the copy of S-Journal "12345" in S-Block 3 (the S-Block being garbage collected) is obsolete. Likewise, if the S-Journal Map entry instead points to the E-Page from S-Block 3 where S-Journal "12345" currently resides, S-Journal "12345" is still valid.

Figure 16:
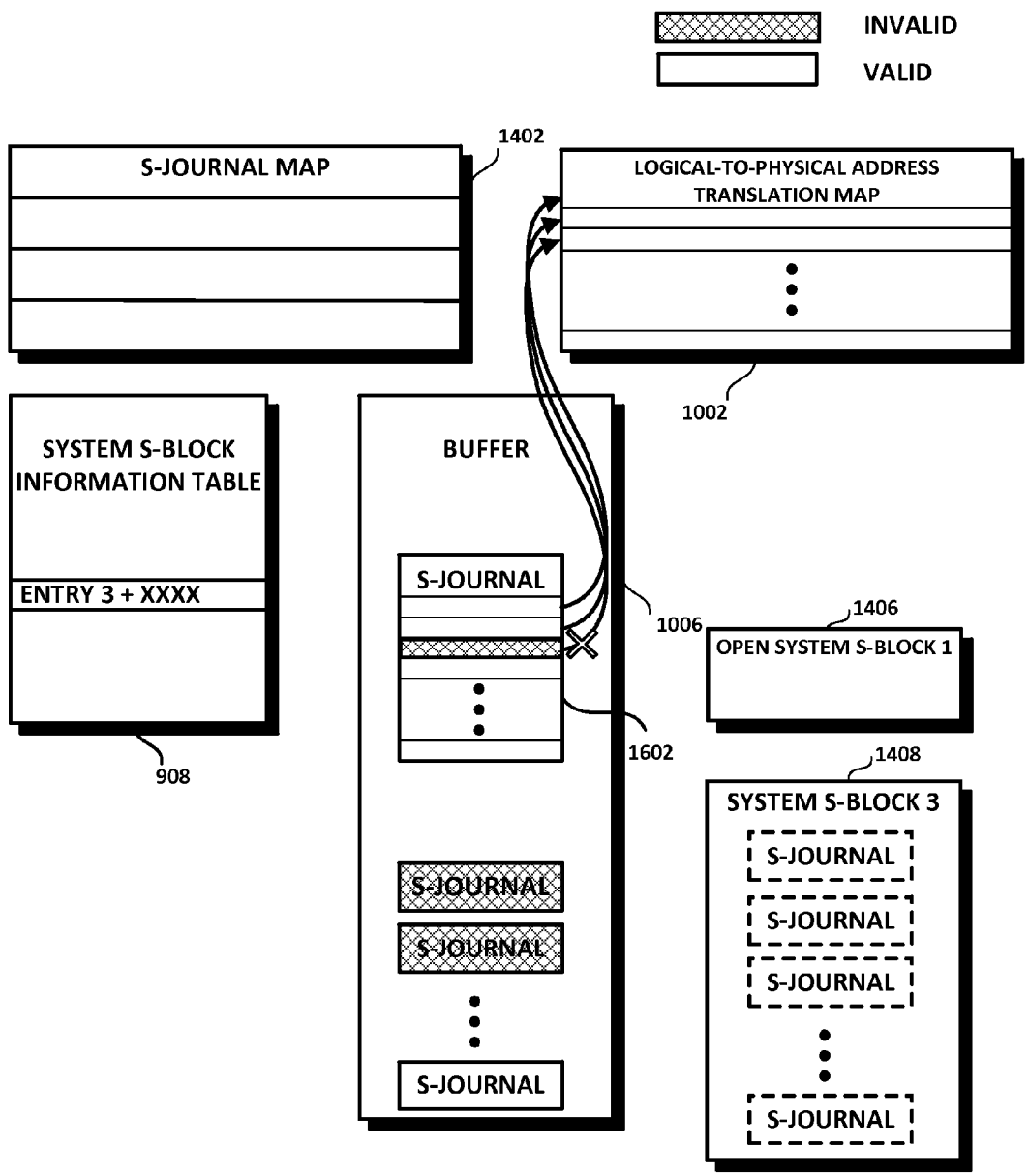
FIG. 16 is a block diagram illustrating still further aspects of garbage collecting a system block, according to one embodiment.

In one embodiment, a valid S-Journal being garbage collected may include a mix of valid and invalid entries, thus individual checking of the entries is needed. As shown in FIG. 16, each entry in each valid S-Journal 1602 may then be matched with a corresponding entry in the logical-to-physical address translation map 1002 in memory. That is, the E-Page address of the L-Page referenced by each S-Journal entry may be compared with the E-Page address of the L-Page specified in the logical-to-physical address translation map 1002. If the two match, that S-Journal entry is valid. According to one embodiment, it may be necessary to compare the E-Page address and the offset within the E-Page in the S-Journal with the E-Page address and the offset within the E-page of the L-Page specified in the logical-to-physical address translation map 1002. Conversely, if the E-page address (or E-page address and offset) for the L-Page in the S-Journal does not match the E-Page address (or E-page address and offset) in the entry for that L-Page in the address translation map 1002, that entry in the S-Journal is not valid.

Figure 17:
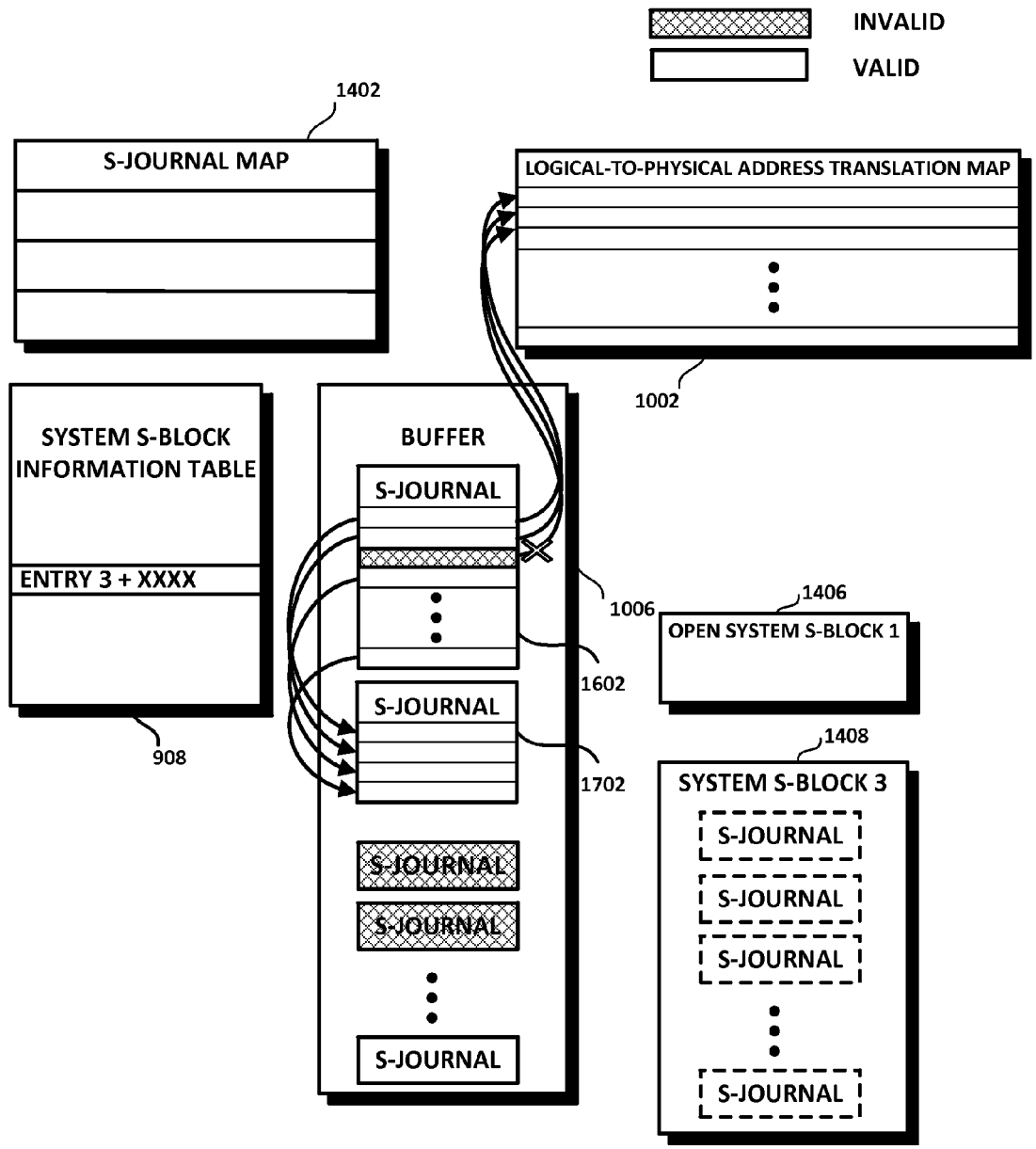
FIG. 17 is a block diagram illustrating yet further aspects of garbage collecting a system block, according to one embodiment.

According to one embodiment, as valid entries are identified in the S-Journal 1602 (whose entries are being parsed and compared), they may be copied to a new version 1702 of the S-Journal 1602, as shown in FIG. 17. The new S-Journal 1702, according to one embodiment, may have the same S-Journal number as that of the S-Journal 1602. In this manner, each S-Journal loaded into the buffer 1006 from the S-Block picked for GC may be first determined to be valid or invalid at the journal level, and then, if determined valid, compacted to contain only valid entries. According to one embodiment, an S-Journal with no valid entries may still be generated. According to one embodiment, an S-Journal having no valid entries may be discarded. According to one embodiment, invalid S-Journal entries are simply not copied to the new version of the S-Journal 1702. Accordingly, it is expected that the new version 1702 of the S-Journal will be smaller (i.e., comprise fewer entries) than the older version 1602 thereof, presuming that the S-Journal 1602 had one or more obsolete entries. It is to be noted that if an S-Journal has all valid entries, the size of the new version thereof will remain the same.

Figure 18:
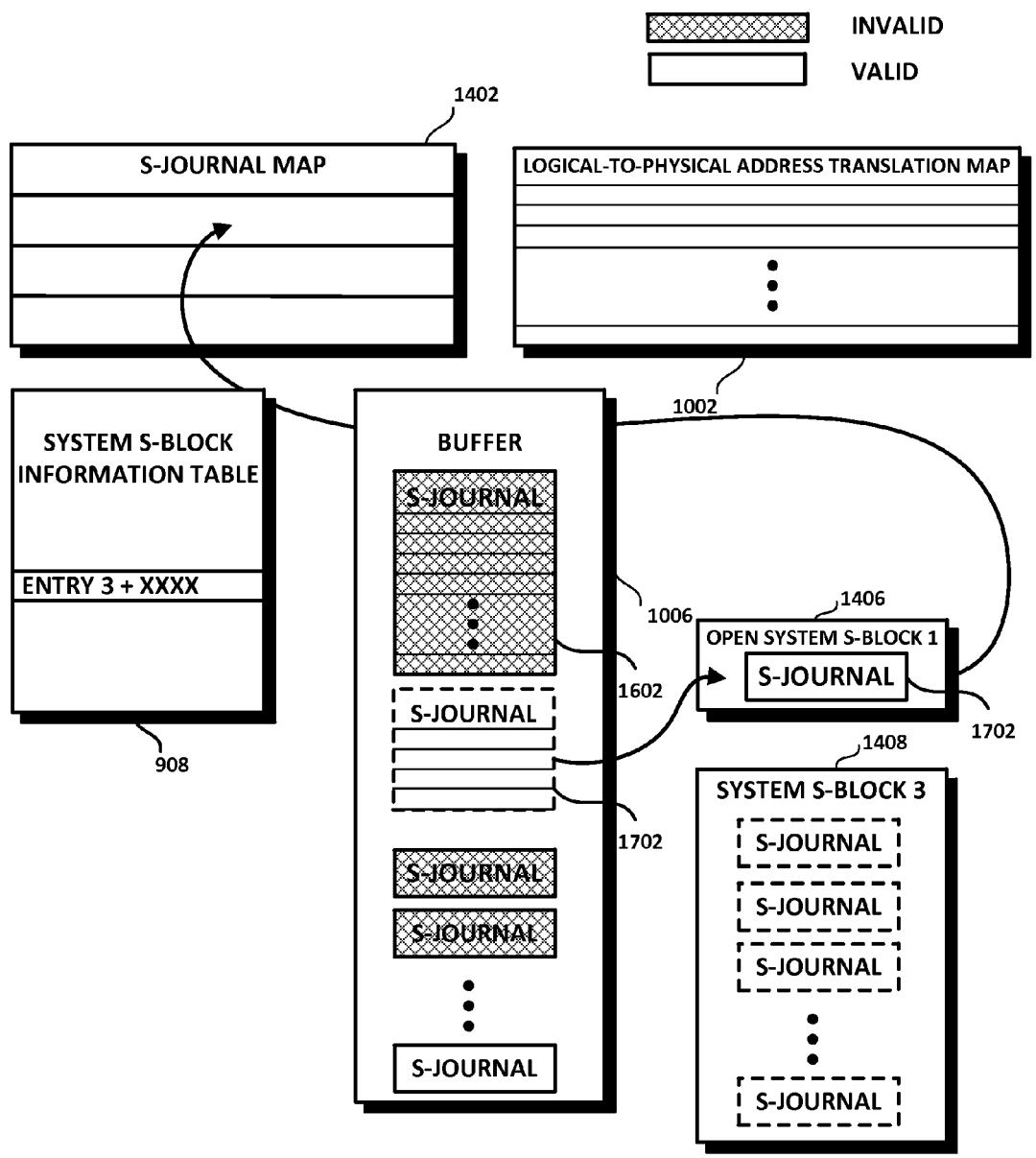
FIG. 18 is a block diagram illustrating further aspects of garbage collecting a system block, according to one embodiment.

As shown in FIG. 18, the S-Journal 1702 (the new version of the S-Journal 1602, which is now invalid or obsolete) may then be written to the current open System S-Block which, in FIG. 18, is Open System S-Block 1, reference numeral 1406. Thereafter, the S-Journal Map 1402 may be updated with the new location of the S-Journal 1702 in Open System S-Block 1. At the end of this process, the S-Journals in System S-Block 3 (1408) have been garbage collected and System S-Block 3 may then be erased and made available for future programming.

Method of Controlling a Data Storage Device

Figure 19:
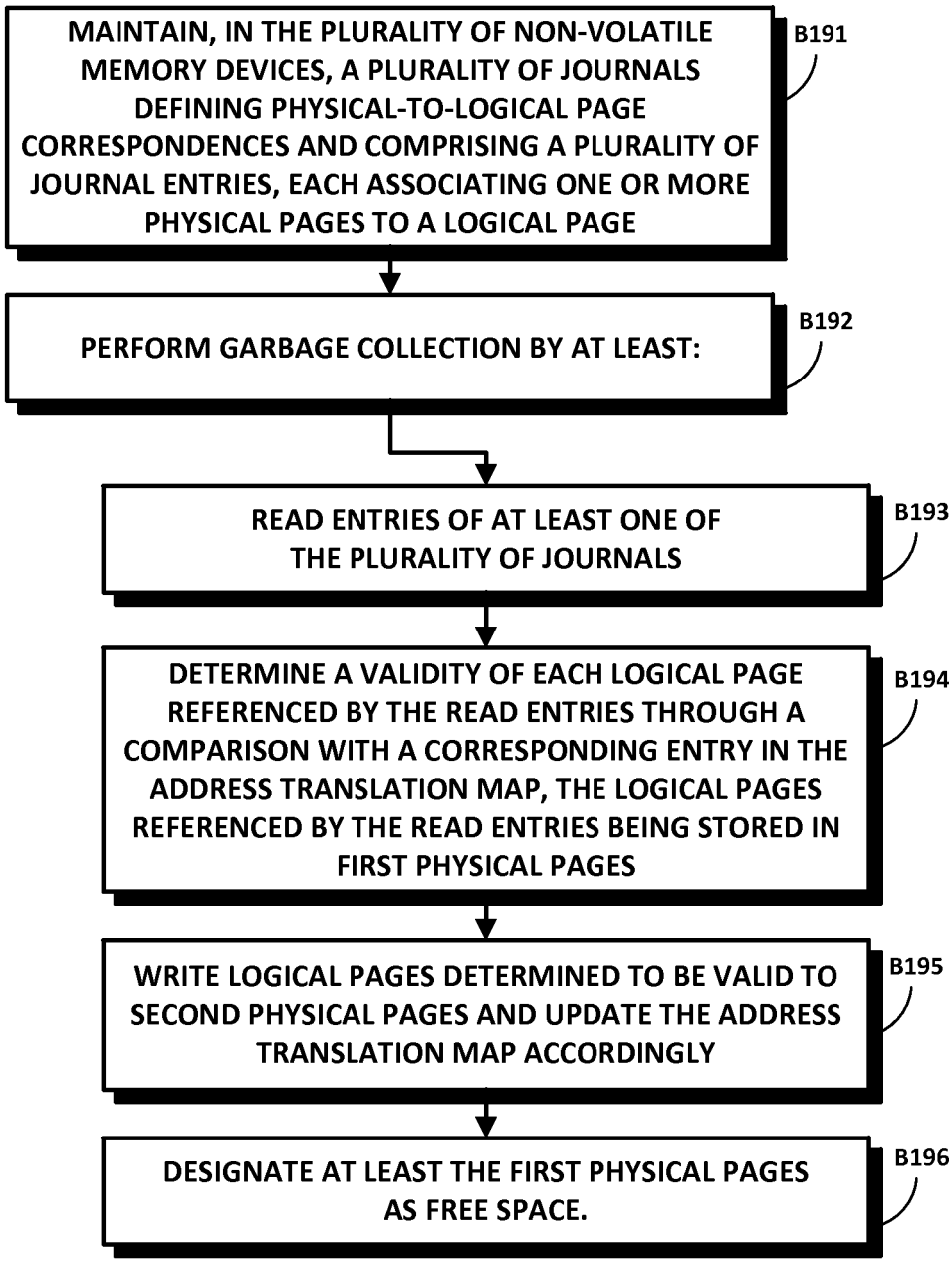
FIG. 19 is a flowchart of a method of controlling a data storage device, according to one embodiment.

One embodiment is a method for controlling a data storage device. The data storage device may comprise a plurality of non-volatile memory devices such as shown, for example, at 206 in FIG. 2. Each of these non-volatile memory devices may be configured to store a plurality of physical pages, such as E-Pages, for example. A controller 202 may be coupled to the plurality of memory devices (such as flash blocks 206, memory dies etc.), which controller may be configured to program data to and read data from the plurality of memory devices 206. A first volatile memory (shown, for example, in FIG. 3) may be configured to store a logical-to-physical address translation map 302 that may be configured to enable the controller 202 to determine a physical location (i.e., within the non-volatile memory devices 206) of logical pages stored within one or more of the physical pages. The method, as shown in FIG. 19, may comprise maintaining, in the plurality of non-volatile memory devices, a plurality of journals defining physical-to-logical page correspondences and comprising a plurality of journal entries. Each entry may associate one or more physical pages to a logical page, as shown at Block B191. Block B192 calls for garbage collection to be performed according to (at least) Blocks B193-B196. As shown at B193, entries of one or more of the plurality of journals may be read. As shown at B194, the validity of each logical page referenced by the read entries may then be determined through a comparison with a corresponding entry in the address translation map, such as shown at 1002. The logical pages referenced by the read entries of the address translation map 1002 may be stored in first physical pages (e.g. E-Pages). Thereafter, as shown at B195, the logical pages that were thus determined to be valid may be written to second physical pages (i.e., different than the first physical pages). For example, the logical pages determined to be valid may be written to an S-Block that is different from the S-Block currently being garbage collected. The address translation map 1002 may then be updated accordingly.

Lastly and as shown at Block B196, at least the first physical pages may now be designated as free space. In the case in which an S-Block is being garbage collected, at the end of the process, all of the physical pages of the S-Block having been garbage collected may now be designated as free space.

According to one embodiment, before updating the address translation map 1002, it may be determined whether the address translation map 1002 has been updated to invalidate the logical pages previously determined to be valid. Indeed, for logical pages that have not been invalidated, the address translation map 1002 may be updated to reflect locations of the data in the second physical pages. Similarly, for logical pages that have, in fact, been invalidated, no updating of the address translation map 1002 may be carried out.

According to one embodiment, before writing the logical pages determined to be valid to the second physical pages and updating the address translation map, it may be determined whether the address translation map 1002 has been updated to invalidate the logical pages previously determined to be valid. The logical pages that have not been invalidated may be written to the second physical pages and the address translation map 1002 may be correspondingly updated to reflect such locations in the second physical pages. Conversely, for logical pages that have indeed been invalidated, no writing to the second physical pages need be implemented and the address translation map 1002 need not be updated. Thereafter, one or more new journals may be generated, which newly-generated journals may comprise entries associating the second physical pages to the valid logical pages. The generated journal(s) may be written to a second volatile memory. To ensure coherency, the journal(s) in the second volatile memory may be scanned for invalid entries through comparison with corresponding entries in the address translation map 1002. Any invalid entries therein may then be removed from the journal(s). Thereafter, the scanned journal(s) may then be written to the non-volatile memory devices (such as flash blocks 206) before any other journal(s) is/are written to the non-volatile devices. In this manner, the just-scanned journal is the next journal written out to the non-volatile devices.

The garbage collection may also comprise adding at least an aggregate size of the first physical pages designated as free space to a running count of free space (in the S-Block, for example). As shown in and described relative to FIGS. 7 and 8, the plurality of non-volatile memory devices may comprise a plurality of superblocks, with each superblock comprising one block per die within the devices. According to one embodiment, one or more of the plurality of journals may be associated with a superblock. In this manner, journal entries read as part of the garbage collection process may be entries from at least one journal associated with a selected superblock. A superblock may be selected for garbage collection, for example, based at least in part upon the PE count of the selected superblock. A superblock may also be selected for garbage collection based at least in part upon the amount of free space therein, or based upon the amount of data stored therein. Accordingly, the second physical pages referred to above may be associated with a superblock that has been designated as a superblock for storing valid logical pages from garbage collection operations. According to one embodiment, the garbage collection may be carried out in whole or in part, in hardware. For example, the performance of the garbage collection may be optimized due to the use of the above described journaling schemes. These journaling schemes in one embodiment require serialized processing to reconstruct mapping information at start up, and such a reconstruction process is preferably implemented in hardware to meet performance requirements.

Figure 20:
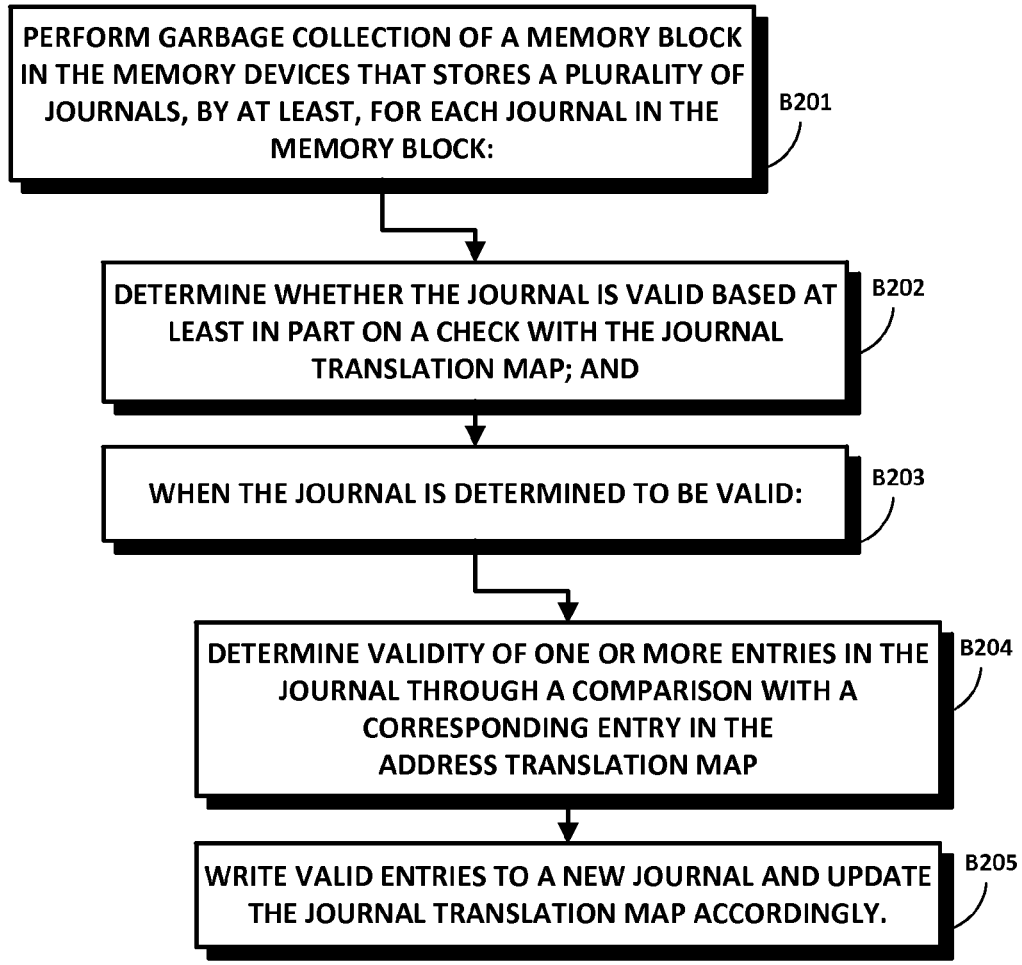
FIG. 20 is a flowchart of a method of garbage collecting a system block of a data storage device, according to one embodiment.

FIG. 20 is a flowchart of a method of garbage collecting a system block of a data storage device, according to one embodiment. As described above, the data storage device may comprise a plurality of non-volatile memory devices (which may include, e.g., flash blocks 206), a controller 202 and a volatile memory, such as shown at 302 in FIG. 3. The controller 202 may be coupled to the plurality of memory devices and may be configured to write data to and read data from such memory devices. The controller 202 may be configured to maintain, in the memory devices, a plurality of journals (e.g., S-Journals as described and shown herein) comprising a plurality of journal entries, each journal entry associating a physical location in the memory devices to a logical page that is stored in the memory devices 206. As shown and described above, the volatile memory may be configured to store a logical-to-physical address translation map (such as shown at 1002) that may be configured to enable the controller 202 to determine the physical location of the logical pages within the memory devices. The volatile memory may be further configured to store a journal translation map (as shown at 1402 in FIGS. 14-18) that may be configured, as shown and described above, to enable the controller 202 to determine the physical location of the journals within the memory devices.

According to one embodiment, the controller 202 may be configured to garbage collect a selected system block by carrying out at least the functionality shown in Blocks B201-B205. Indeed, as shown at B201, garbage collection of a memory block in the memory devices that stores a plurality of journals (i.e., a system block) may be carried out by implementing at least Blocks B202-B205, for each journal in the memory block. That is, for each journal in the selected memory block, it may be determined whether the journal is valid, based at least in part on a check with the journal translation map 1402. If the journal is determined to be valid, Blocks B204 and B205 may be implemented. As shown at B204, the validity of one or more entries in the journal may be determined through a comparison with a corresponding entry in the address translation map 1002. Valid entries may be written to a new journal and the journal translation map 1402 may be updated accordingly. After all journals of the selected memory block have been thus compacted and the valid entries thereof written to a new journal or journals, the system memory block thus garbage collected may be designated as being free space.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A solid state drive controller, comprising:
a processor configured to couple to a plurality of non-volatile memory devices, each configured to store a plurality of physical pages; and
a first volatile memory configured to store a logical-to-physical address translation map configured to enable the controller to determine a physical location of logical pages stored within one or more of the plurality of physical pages;
wherein the processor is further configured to:
maintain, in the plurality of non-volatile memory devices, a plurality of journals defining physical-to-logical page correspondences and comprising a plurality of journal entries, each entry associating one or more physical pages to a logical page, at least one of the plurality of journals containing last-in-time updates to logical pages and stale entries that no longer point to valid logical pages,
wherein each of the plurality of journals covers a predetermined physical region of the non-volatile memory, the predetermined physical region comprising a predetermined range of the plurality of physical pages, and each of the plurality of journals comprises an identification number based on address information of a physical page covered by the journal;
create a journal entry directly into one of the plurality of journals each time a logical page in the logical-to-physical address translation map is updated; and
perform garbage collection, wherein garbage collection comprises:
reading entries of at least one of the plurality of journals;
determining a validity of each logical page referenced by the read entries through a comparison with a corresponding entry in the address translation map, wherein the logical pages referenced by the read entries are stored in first physical pages;
writing logical pages determined to be valid to second physical pages and updating the address translation map accordingly; and
designating at least the first physical pages as free space.

2. The solid state drive controller of claim 1, wherein the processor is further configured to:
before updating the address translation map, determine whether the address translation map has been updated to invalidate the logical pages previously determined to be valid,
for logical pages that have not been invalidated, update the address translation map to reflect locations in the second physical pages; and
for logical pages that have been invalidated, do not update the address translation map to reflect locations in the second physical pages.

3. The solid state drive controller of claim 2, wherein at least one of the logical pages written to the second physical pages has been invalidated.

4. The solid state drive controller of claim 1, wherein the processor is further configured to:
before writing the logical pages determined to be valid to the second physical pages and updating the address translation map,
determine whether the address translation map has been updated to invalidate the logical pages previously determined to be valid,
for logical pages that have not been invalidated, write to the second physical pages and update the address translation map to reflect locations in the second physical pages; and
for logical pages that have been invalidated, do not write to the second physical pages and do not update the address translation map for the logical pages that have been invalidated.

5. The solid state drive controller of claim 1, wherein the processor is further configured to generate at least one new journal comprising entries associating the second physical pages to the valid logical pages.

6. The solid state drive controller of claim 5, wherein the processor is further configured to write the generated journal to a second volatile memory.

7. The solid state drive controller of claim 6, wherein the processor is further configured to scan the journal written to the second volatile memory for invalid entries through comparison with corresponding entries in the address translation map.

8. The solid state drive controller of claim 7, wherein the processor is further configured to remove any invalid entries from the scanned journal.

9. The solid state drive controller of claim 7, wherein the processor is further configured to write the scanned journal to the non-volatile devices before any other journal is written to the non-volatile devices.

10. The solid state drive controller of claim 1, wherein the processor is further configured to add at least an aggregate size of the first physical pages designated as free space to a running count of free space.

11. The solid state drive controller of claim 1, wherein the plurality of non-volatile memory devices comprise a plurality of superblocks, each comprising one block per die within the devices, and wherein one or more of the plurality of journals are associated with a superblock.

12. The solid state drive controller of claim 11, wherein the entries read as part of the garbage collection are from at least one journal associated with a selected superblock.

13. The solid state drive controller of claim 12, wherein the processor is further configured to choose the selected superblock based at least in part upon a program erase (PE) count of the selected superblock.

14. The solid state drive controller of claim 12, wherein the processor is further configured to choose the selected superblock based at least in part upon an amount of free space therein.

15. The solid state drive controller of claim 11, wherein the second physical pages are associated with a superblock that has been designated as a superblock for storing valid logical pages from garbage collection operations.

16. The solid state drive controller of claim 1, wherein the garbage collection is performed in hardware.

17. A data storage device, comprising:
the plurality of non-volatile memory devices; and
the solid state drive controller of claim 1.

18. A solid state drive controller, comprising:
a processor configured to couple to a plurality of non-volatile memory devices, each configured to store a plurality of physical pages and to:
write data to and read data from the memory devices; and maintain, in the memory devices, a plurality of journals comprising a plurality of journal entries, each entry associating a physical location in the memory devices to a logical page that is stored in the memory devices, at least one of the plurality of journals containing last-in-time updates to logical pages and stale entries that no longer point to valid logical pages, wherein each of the plurality of journals covers a predetermined physical region of the non-volatile memory, the predetermined physical region comprising a predetermined range of the plurality of physical pages, and each of the plurality of journals comprises an identification number based on address information of a physical page covered by the journal;

create a journal entry directly into one of the plurality of journals each time a logical page is updated;

a volatile memory configured to store:
  a logical-to-physical address translation map configured to enable the processor to determine a physical location of the logical pages within the memory devices; and
  a journal translation map configured to enable the processor to determine a physical location of the journals within the memory devices;

wherein the processor is further configured to:
  perform garbage collection of a memory block in the memory devices that stores a plurality of journals, the performing including at least, for each journal in the memory block:
    determining whether the journal is valid based at least in part on a check with the journal translation map;
  when the journal is determined to be valid,
    determining validity of one or more entries in the journal through a comparison with a corresponding entry in the address translation map; and
    writing valid entries to a new journal and updating the journal translation map accordingly.

19. The solid state drive controller of claim 18, wherein the processor is further configured to designate at least the memory block as free space.

20. A data storage device, comprising:
  the plurality of non-volatile memory devices; and
  the solid state drive controller of claim 18.

21. A method for controlling a data storage device, the data storage device comprising a plurality of non-volatile memory devices, each being configured to store a plurality of physical pages; a controller coupled to the plurality of memory devices and configured to program data to and read data from the plurality of memory devices; and a first volatile memory configured to store a logical-to-physical address translation map configured to enable the controller to determine a physical location of logical pages stored within one or more of the plurality of physical pages, the method comprising:
  maintaining, in the plurality of non-volatile memory devices, a plurality of journals defining physical-to-logical page correspondences and comprising a plurality of journal entries, each associating one or more physical pages to a logical page, at least one of the plurality of journals containing last-in-time updates to logical pages and stale entries that no longer point to valid logical pages,
  wherein each of the plurality of journals covers a predetermined physical region of the non-volatile memory, the predetermined physical region comprising a predetermined range of the plurality of physical pages, and each of the plurality of journals comprises an identification number based on address information of a physical page covered by the journal;
  creating a journal entry directly into one of the plurality of journals each time a logical page in the logical-to-physical address translation map is updated; and
  performing garbage collection by at least:
  reading entries of at least one of the plurality of journals;
  determining a validity of each logical page referenced by the read entries through a comparison with a corresponding entry in the address translation map, wherein the logical pages referenced by the read entries are stored in first physical pages;
  writing logical pages determined to be valid to second physical pages and updating the address translation map accordingly; and
  designating at least the first physical pages as free space.

22. The method of claim 21, further comprising:
  before updating the address translation map, determining whether the address translation map has been updated to invalidate the logical pages previously determined to be valid,
  for logical pages that have not been invalidated, updating the address translation map to reflect locations in the second physical pages; and
  for logical pages that have been invalidated, not updating the address translation map to reflect locations in the second physical pages.

23. The method of claim 22, wherein at least one of the logical pages written to the second physical pages has been invalidated.

24. The method of claim 21, further comprising:
  before writing the logical pages determined to be valid to the second physical pages and updating the address translation map, determining whether the address translation map has been updated to invalidate the logical pages previously determined to be valid,
  for logical pages that have not been invalidated, writing to the second physical pages and updating the address translation map to reflect locations in the second physical pages; and
  for logical pages that have been invalidated, not writing to the second physical pages and not updating the address translation map for the logical pages that have been invalidated.

25. The method of claim 21, further comprising generating at least one new journal comprising entries associating the second physical pages to the valid logical pages.

26. The method of claim 25, further comprising writing the generated journal to a second volatile memory.

27. The method of claim 26, further comprising scanning the journal written to the second volatile memory for invalid entries through comparison with corresponding entries in the address translation map.

28. The method of claim 27, further comprising removing any invalid entries from the scanned journal.

29. The method of claim 27, further comprising writing the scanned journal to the non-volatile memory devices before any other journal is written to the non-volatile memory devices.

30. The method of claim 21, further comprising adding at least an aggregate size of the first physical pages designated as free space to a running count of free space.

31. The method of claim 21, wherein the plurality of non-volatile memory devices comprise a plurality of superblocks, each comprising one block per die within the devices, and wherein one or more of the plurality of journals are associated with a superblock.

32. The method of claim 31, wherein the entries read as part of the garbage collection are from at least one journal associated with a selected superblock.

33. The method of claim 32, further comprising choosing the selected superblock based at least in part upon a program erase (PE) count of the selected superblock.

34. The method of claim 32, further comprising choosing the selected superblock based at least in part upon an amount of free space therein.

35. The method of claim 31, wherein the second physical pages are associated with a superblock that has been designated as a superblock for storing valid logical pages from garbage collection operations.

36. The method of claim 21, further comprising performing the garbage collection in hardware.

37. A method of controlling a data storage device, the data storage device comprising a plurality of non-volatile memory devices each configured to store a plurality of physical pages, a controller and a volatile memory, the controller being coupled to the plurality of memory devices and being configured to write data to and read data from the memory devices, the method comprising the controller:
   maintaining, in the memory devices, a plurality of journals comprising a plurality of journal entries, each entry associating a physical location in the memory devices to a logical page that is stored in the memory devices, at least one of the plurality of journals containing last-in-time updates to logical pages and stale entries that no longer point to valid logical pages,
   wherein each of the plurality of journals covers a predetermined physical region of the non-volatile memory, the predetermined physical region comprising a predetermined range of the plurality of physical pages, and each of the plurality of journals comprises an identification number based on address information of a physical page covered by the journal;
   creating a journal entry directly into one of the plurality of journals each time a logical page is updated;
   storing, in the volatile memory, a logical-to-physical address translation map configured to enable the controller to determine a physical location of the logical pages within the memory devices;
   storing, in the volatile memory, a journal translation map configured to enable the controller to determine a physical location of the journals within the memory devices;
   performing garbage collection of a memory block in the memory devices that stores a plurality of journals, by at least, for each journal in the memory block,
   determining whether the journal is valid based at least in part on a check with the journal translation map; and
   when the journal is determined to be valid,
   determining validity of one or more entries in the journal through a comparison with a corresponding entry in the address translation map; and
   writing valid entries to a new journal and updating the address translation map accordingly.

38. The method of claim 37, further comprising designating at least the memory block as free space.

* * * * *